United States Patent

Kim et al.

[11] Patent Number: 5,943,250
[45] Date of Patent: Aug. 24, 1999

[54] PARALLEL MULTIPLIER THAT SUPPORTS MULTIPLE NUMBERS WITH DIFFERENT BIT LENGTHS

[75] Inventors: Chang Soo Kim, San Jose; Le T. Nguyen, Monte Sereno; Roney S. Wong, Sunnyvale, all of Calif.

[73] Assignee: Samsung Electronics Co., Ltd., Seoul, Rep. of Korea

[21] Appl. No.: 08/734,277

[22] Filed: Oct. 21, 1996

[51] Int. Cl.[6] ........................................................ G06F 7/52
[52] U.S. Cl. ................ 364/757; 364/760.02; 364/786.03
[58] Field of Search ................................... 364/745, 757, 364/749, 759, 760.02, 786.03

[56] References Cited

U.S. PATENT DOCUMENTS

| | | | |
|---|---|---|---|
| 4,575,812 | 3/1986 | Kloker et al. | 364/760.03 |
| 5,060,183 | 10/1991 | Sakashita et al. | 364/757 |
| 5,181,185 | 1/1993 | Han et al. | 364/760.01 |
| 5,303,176 | 4/1994 | Hrusecky et al. | 364/759 |
| 5,325,320 | 6/1994 | Chiu | 364/760.02 |
| 5,506,799 | 4/1996 | Nakao | 364/760.01 |
| 5,691,930 | 11/1997 | Kim | 364/760.01 |
| 5,764,558 | 6/1998 | Pearson et al. | 364/757 |

*Primary Examiner*—Emmanuel L. Moise
*Attorney, Agent, or Firm*—Skjerven, Morrill, MacPherson, Franklin & Friel, L.L.P.

[57] ABSTRACT

A parallel multiplier for multiplying a multiplicand and multiplier with large bit lengths as well as simultaneously multiplying several multiplicands and multipliers with smaller bit lengths is disclosed. The parallel multiplier receives an N-bit multiplicand operand, an M-bit multiplier operand, and a data length signal. The parallel multiplier calculates an N+M bit product of an N-bit multiplicand from the multiplicand operand and an M-bit multiplier from the multiplier operand when the data length signal selects a first bit length. Furthermore, the parallel multiplier simultaneously calculates an (N+M)/2 bit first product of an N/2 bit first multiplicand from the multiplicand operand and an M/2 bit first multiplier from the multiplier operand, and an (N+M)/2 bit second product of an N/2 bit second multiplicand from the multiplicand operand and an M/2 bit second multiplier from the multiplier operand when the data length signal selects a second bit length.

20 Claims, 9 Drawing Sheets

PARALLEL MULTIPLIER THAT SUPPORTS MULTIPLE NUMBERS WITH DIFFERENT BIT LENGTHS

BACKGROUND OF THE INVENTION

1. Field of the Invention

The present invention relates to computer arithmetic, and more particularly to parallel multipliers.

2. Description of Related Art

Parallel multipliers are widely used in systems such as arithmetic logic units (ALUs) of high-performance computers. Parallel multipliers are often configured with a parallelogram arrangement of logic cells. A multiplicand and multiplier are applied to rows of the logic cells, and partial products are summed to provide the final product.

The modified Booth's algorithm (or bit-pair recoding) examines multiplier bit-pairs $Y_{i+1}$ and $Y_i$ along with previous multiplier bits $Y_{i-1}$ and recodes the bit-pairs as a single value. Although the recoded bit-pairs specify one of five different operations on the multiplicand, the partial products are based on the recoded bit-pairs rather than individual bits of the multiplier. As a result, the number of partial products is reduced by one-half, which provides for faster computation. The modified Booth's algorithm is summarized below in Table 1.

TABLE 1

MODIFIED BOOTH'S ALGORITHM

| Multiplier Bit-Pair | | Multiplier Bit on Right | Operation on |
|---|---|---|---|
| $Y_{i+1}$ | $Y_i$ | $Y_{i-1}$ | Multiplicand (x) |
| 0 | 0 | 0 | $0 \times X$ |
| 0 | 0 | 1 | $+1 \times X$ |
| 0 | 1 | 0 | $+1 \times X$ |
| 0 | 1 | 1 | $+2 \times X$ |
| 1 | 0 | 0 | $-2 \times X$ |
| 1 | 0 | 1 | $-1 \times X$ |
| 1 | 1 | 0 | $-1 \times X$ |
| 1 | 1 | 1 | $0 \times X$ |

A Wallace tree provides even faster computation by summing groups of partial products in parallel, but an irregular wiring structure is required. Therefore, a Wallace tree is desirable when performance is the main issue, but the increased wiring complexity is a drawback.

In parallel multipliers using a parallelogram arrangement or Wallace tree, the final step is usually adding the final sum bits and carry-out bits using a carry propagate adder such as a carry lookahead adder.

Signed binary numbers are usually represented in computers using four systems: sign-magnitude, 2's complement, 1's complement, and biased. Of these systems, 2's complement is the most popular due to the ease of implementing addition and subtraction.

In parallel multipliers for 2's complement numbers, the sign-bit of each partial product is sign-extended to the left edge of the eventual product. Sign extension can be provided by any suitable hardware or software. For instance, positive numbers can be sign-extended by propagating zero's to the left end, and negative numbers can be sign-extended by propagating one's to the left end. The sign generate method for sign extension is especially useful since the sign bit is generated statically and need not propagate to the left edge of the eventual product. The sign generate method includes (1) complementing the sign bit of each partial product, (2) adding a one to the left of the sign bit position of each partial product, and (3) adding a one to the sign bit position of the first partial product.

Further details regarding the sign generate method are found in "Digital CMOS Circuit Design" by M. Annaratone, published by Kluwer Academic Publishers, 1986, pp. 211–229, which is incorporated by reference.

FIG. 1 is a schematic view showing parallel multiplication of a single multiplicand and a single multiplier using the modified Booth's algorithm and the sign generate method in accordance with the prior art. In this case, a 32-bit multiplicand X is multiplied by a 32-bit multiplier Y to provide a 64-bit product, and the numbers are represented in 2's complement form. Since the modified Booth's algorithm is used, 16 partial products PP1–PP16 are generated, each partial product occupies 33 bit positions, and each successive partial product is left shifted by two bit positions with respect to the previous partial product.

Each partial product is set to either zero, the multiplicand (with the sign bit propagated left by one bit position), the complement of the multiplicand (with the sign bit propagated left by one bit position), the multiplicand left shifted by one bit position (with the LSB filled with a zero), or the complement of the multiplicand left shifted by one bit position (with the LSB filled with a one) in accordance with the modified Booth's algorithm. In this manner, each partial product contains an "adjusted multiplicand." Furthermore, since negating a 2's complement number requires complementing the number and incrementing by one, an increment bit (I) is added to the LSB of each partial product in accordance with the modified Booth's algorithm. For each partial product, the associated increment bit (shown directly beneath the LSB) is set to a one when the complement of the multiplicand or the complement of the multiplicand left shifted by one bit position is selected, and is otherwise set to zero. Therefore, when the complement of the multiplicand is left shifted by one bit position, the combination of the one filled into the LSB position and the increment bit set to one at the LSB position is equivalent to adding a one to the bit position adjacent to the LSB position and filling the LSB position with a zero.

Since the sign generate method is used, the sign bit of each partial product is complemented ($\overline{S}$), a one is added to the immediate left of each sign bit position, and a one is added to the sign bit position of the first partial product.

For instance, partial product PP1 occupies bit positions 0–32, receives selection signals generated by multiplier bit-pair $Y_1$ and $Y_0$ and a previous bit of zero using the modified Booth's algorithm, has an increment bit at bit position 0 set by multiplier bit-pair $Y_1$ and $Y_0$ and a previous bit of zero using the modified Booth's algorithm, and has a one added to bit position 33 which is adjacent to the complemented sign bit at bit position 32.

Thereafter, the partial products and the extra one's (from the sign generate method and the increment bits) are added to provide the final product. The partial products can be sequentially added using carry save adders configured as a parallelogram that adds partial products PP1 and PP2, adds the sum of partial products PP1 and PP2 to partial product PP3, etc. Alternatively, the partial products can be added using carry save adders configured as a Wallace tree that adds partial products PP1–PP4 to provide a first intermediate product, partial products PP5–PP8 to provide a second intermediate product, partial products PP9–PP12 to provide a third intermediate product, partial products PP13–PP16 to provide a fourth intermediate product, and adds the four intermediate products to provide the sum of the partial products. The sum of the partial products and the extra one's are added in a final row of carry save adders, and the output of the final row of carry save adders is applied to a carry propagate adder such as a carry lookahead adder that generates the final product.

Data processing applications often require multiplying numbers with different bit lengths such as 32 bits (word), 16 bits (half word) and 8 bits (byte). A 32×32 bit parallel multiplier can accommodate 16 and 8 bit numbers merely by sign extending the numbers into 32 bit words. However, with this approach, the parallel multiplier generates only a single product, regardless of the bit length of the numbers.

Accordingly, a need exists for an improved parallel multiplier that accommodates multiple numbers with different bits lengths in a more efficient manner.

SUMMARY OF THE INVENTION

The present invention provides a parallel multiplier for multiplying a multiplicand and multiplier with large bit lengths as well as for simultaneously and independently multiplying several multiplicands and multipliers with smaller bit lengths.

In accordance with an embodiment of the invention, a parallel multiplier receives an N-bit multiplicand operand, an M-bit multiplier operand, and a data length signal. The parallel multiplier calculates an N+M bit product of an N-bit multiplicand from the multiplicand operand and an M-bit multiplier from the multiplier operand when the data length signal selects a first bit length. Furthermore, the parallel multiplier simultaneously calculates an (N+M)/2 bit first product of an N/2 bit first multiplicand from the multiplicand operand and an M/2 bit first multiplier from the multiplier operand, and an (N+M)/2 bit second product of an N/2 bit second multiplicand from the multiplicand operand and an M/2 bit second multiplier from the multiplier operand when the data length signal selects a second bit length.

Preferably, the parallel multiplier includes a Booth's decoder for recoding bit-pairs of the multiplier(s) in accordance with the modified Booth's algorithm, partial product generators for generating partial products, a data selector for generating a data word in accordance with the sign generate method, and an adder for adding the partial products, the data word, and increment bits associated with the partial products.

It is also preferred that the parallel multiplier simultaneously calculate a first (N+M)/4 bit product of an N/4 bit first multiplicand from the multiplicand operand and an M/4 bit first multiplier from the multiplier operand, a second (N+M)/4 bit product of an N/4 bit second multiplicand from the multiplicand operand and an M/4 bit second multiplier from the multiplier operand, a third (N+M)/4 bit product of an N/4 bit third multiplicand from the multiplicand operand and an M/4 bit third multiplier from the multiplier operand, and a fourth (N+M)/4 bit product of an N/4 bit fourth multiplicand from the multiplicand operand and an M/4 bit fourth multiplier from the multiplier operand when a second data length signal selects a third bit length.

These and other aspects, features and advantages of the invention will be further described and more readily apparent from a review of the detailed description of the preferred embodiments which follows.

BRIEF DESCRIPTION OF THE DRAWINGS

In the drawings, which are not necessarily drawn to scale, in which like reference characters indicate like parts.

DETAILED DESCRIPTION OF THE PREFERRED EMBODIMENTS

Figure 2:
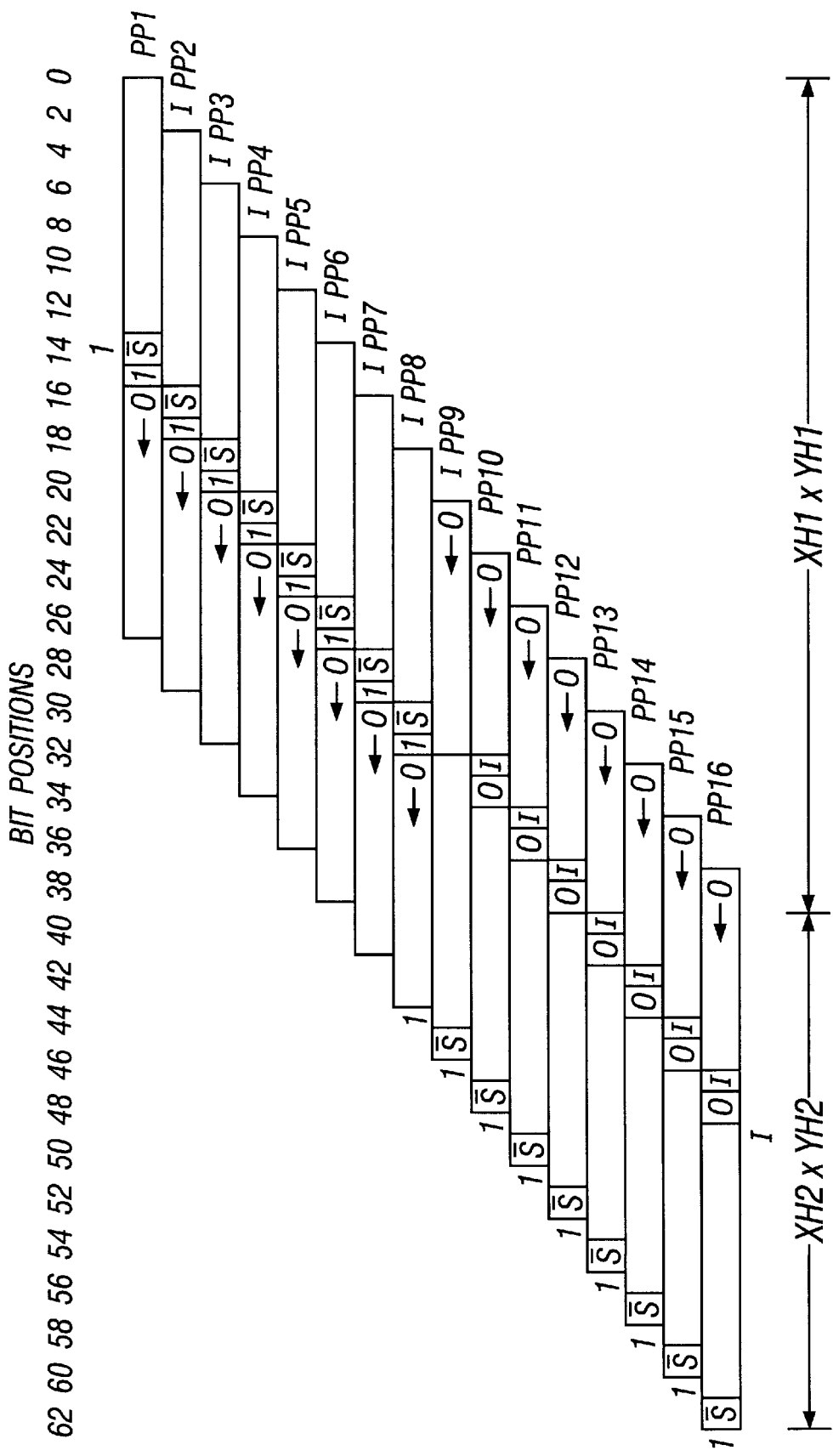
FIG. 2 is a schematic view showing parallel multiplication of two multiplicands and two multipliers using the modified Booth's algorithm and the sign generate method in accordance with an embodiment of the invention.

FIG. 2 is a schematic view showing parallel multiplication of two multiplicands and two multipliers using the modified Booth's algorithm and the sign generate method in accordance an embodiment of the invention. In this case, a first 16-bit multiplicand XH1 is multiplied by a first 16-bit multiplier YH1 during a first multiplication to provide a first 32-bit product, and a second 16-bit multiplicand XH2 is multiplied by a second 16-bit multiplier YH2 during a second multiplication to provide a second 32-bit product. The modified Booth's algorithm is used for both multiplications. Therefore, each of the multiplications requires eight partial products. Partial products PP1–PP16 each occupy 33 bit positions, and each successive partial product is left shifted by two bit positions with respect to the previous partial product. For instance, partial product PP1 occupies bit positions 0–32, partial product PP8 occupies bit positions 14–46, partial product PP9 occupies bit positions 16–48, and partial product PP16 occupies bit positions 30–62.

The first multiplication takes place in bit positions 0–31, and the second multiplication takes place in bit positions 32–63. Moreover, the first multiplication does not affect bit positions 32–63, and the second multiplication does not affect bit positions 0–31. Therefore, the first and second multiplications can proceed simultaneously without interfering with one another.

First multiplicand XH1 as adjusted by first multiplier YH1 using the modified Booth's algorithm is placed in the 17 right-most bit positions of partial products PP1–PP8, and second multiplicand XH2 as adjusted by second multiplier YH2 using the modified Booth's algorithm is placed in the 17 left-most bit positions of partial products PP9–PP16. For instance, bit position 0–16 of partial product PP1 receive multiplicand XH1 as adjusted by bit-pair $YH1_1$ and $YH1_0$ and a previous bit of zero using the modified Booth's algorithm, bit positions 14–30 of partial product PP8 receive multiplicand XH1 as adjusted by bit-pair $YH1_{15}$ and $YH1_{14}$ and previous bit $YH1_{13}$ using the modified Booth's algorithm, bit positions 32–48 of partial product PP9 receive multiplicand XH2 as adjusted by bit-pair $YH2_1$ and $YH2_0$ and a previous bit of zero using the modified Booth's algorithm, and bit positions 46–62 of partial product PP16 receive multiplicand XH2 as adjusted by multiplier bit-pair $YH2_{15}$ and $YH2_{14}$ and a previous bit of $YH2_{13}$ using the modified Booth's algorithm.

Since $YH2_0$ (the LSB of second multiplier YH2) is adjacent to bit $YH1_{15}$ (the MSB of first multiplier YH1), the modified Booth's algorithm treats bit $YH1_{15}$ as a zero when recoding bit-pair $YH2_1$ and $YH2_0$. Furthermore, since bit $XH2_0$ (the LSB of second multiplicand XH2) is adjacent to bit $XH1_{15}$ (the MSB of first multiplicand XH1), partial products PP9–PP16 treat bit $XH1_{15}$ as a zero when left shifting second multiplicand XH2 by one bit position and treat bit $XH1_{15}$ as a one when left shifting the complement of second multiplicand XH2 by one bit position.

The increment bits (I) for partial products PP1–PP8 are added to their respective LSB positions (and are shown directly beneath their respective LSB positions), and the increment bits for partial products PP9–PP16 are added to the LSB positions of their respective 17 left-most bit positions (and are shown directly beneath the LSB positions of their respective 17 left-most bit positions). For instance, the increment bit for partial product PP1 is at bit position 0, and the increment bit for partial product PP9 is at bit position 32. For ease of illustration, the increment bit for partial product PP9 is shown in partial product PP10, the increment bit for partial product PP10 is shown in partial product PP11, etc.

The sign generate method is used for sign extension. Therefore, for both the first and second multiplications, the sign bit of each partial product is complemented ($\overline{S}$), a one is added to the immediate left of each sign bit position, and a one is added to the sign bit position of the first partial product. In the first multiplication, the adjusted multiplicands are placed in the 17 right-most bit positions of partial products PP1–PP8, the sign bits are at the MSB's of the 17 right-most bit positions, and therefore the complemented sign bits are in bit positions 16, 18, 20, 22, 24, 26, 28 and 30 of partial products PP1–PP8, respectively, and a one is added to bit positions 16, 17, 19, 21, 23, 25, 27, 29 and 31. In the second multiplication, the adjusted multiplicands are placed in the 17 left-most bit positions of partial products PP9–PP16, the sign bits are the MSB's of the partial products, and therefore the complemented sign bits are in bit positions 48, 50, 52, 54, 56, 58, 60 and 62 of partial products PP9–PP16, respectively, and a one is added to bit positions 48, 49, 51, 53, 55, 57, 59, 61 and 63.

Preferably, the bit positions of partial products PP1–PP16 that do not receive the adjusted multiplicands are filled with zero's, and the one's from the sign generate method and the increment bits are added to the sum of the partial products. With this approach, the 16 left-most bit positions of partial products PP1–PP8 are filled with zero's, the 16 right-most bit positions of partial products PP9–PP16 are filled with zero's, the one's from the sign generate method in bit positions 16, 17, 19, 21, 23, 25, 27, 29, 31, 48, 49, 51, 53, 55, 57, 59, 61 and 63 are added elsewhere, and the increment bits at bit positions 0, 2, 4, 6, 8, 10, 12, 14, 32, 34, 36, 38, 40, 42, 44 and 46 are added elsewhere.

Partial products PP1–PP16, the one's from the sign generate method and the increment bits are added to provide the first product at bit positions 0–31, and the second product at bit positions 32–63. Advantageously, the first and second multiplications can occur simultaneously without interfering with one another.

Figure 3:
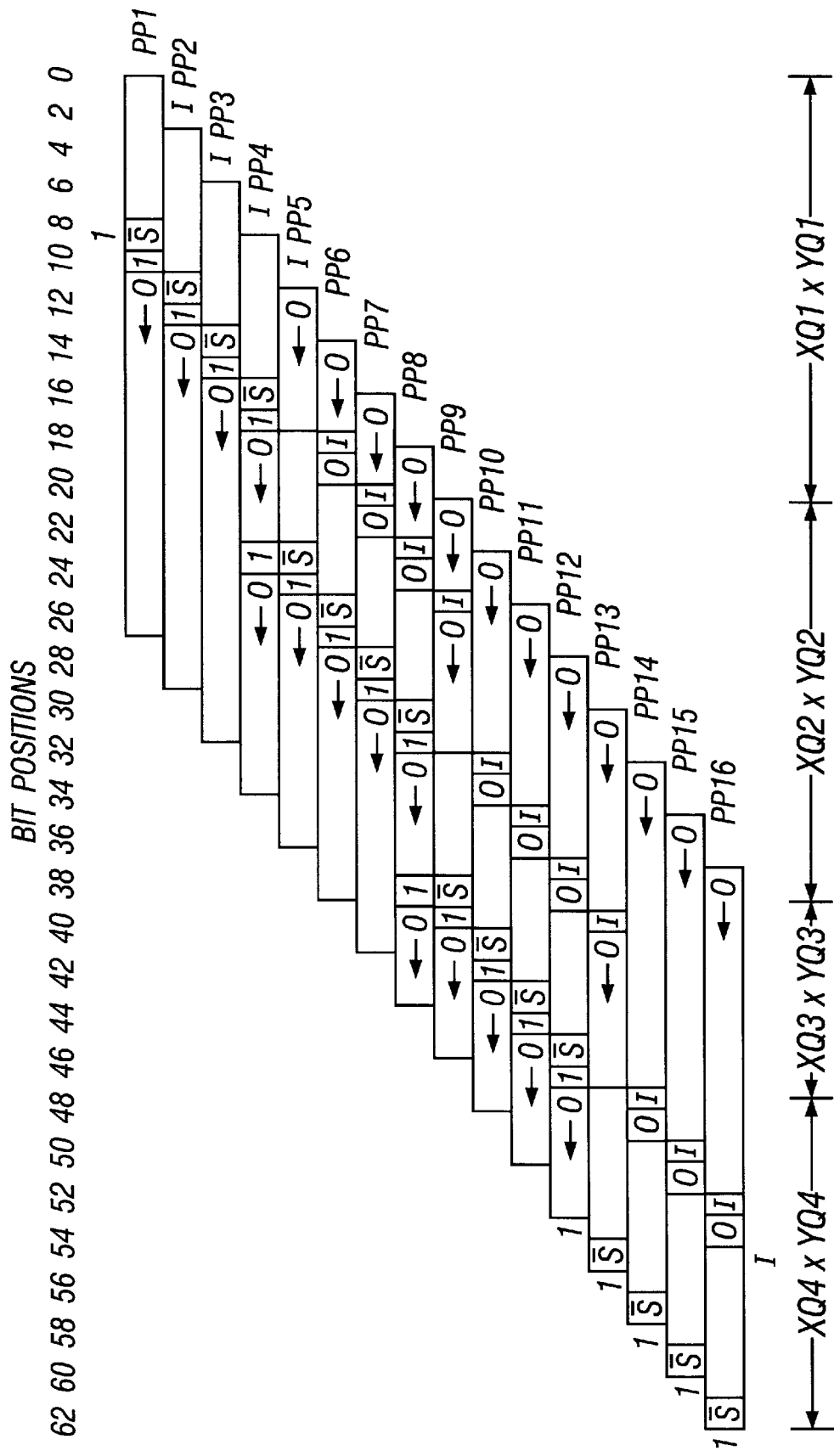
FIG. 3 is a schematic view showing parallel multiplication of four multiplicands and four multipliers using the modified Booth's algorithm and the sign generate method in accordance with an embodiment of the invention.

FIG. 3 is a schematic view showing parallel multiplication of four multiplicands and four multipliers using the modified Booth's algorithm and the sign generate method in accordance with an embodiment of the invention. In this case, a first 8-bit multiplicand XQ1 is multiplied by a first 8-bit multiplier YQ1 during a first multiplication to provide a first 16-bit product, and a second 8-bit multiplicand XQ2 is multiplied by a second 8-bit multiplier YQ2 during a second multiplication to provide a second 16-bit product, a third 8-bit multiplicand XQ3 is multiplied by a third 8-bit multiplier YQ3 during a third multiplication to provide a third 16-bit product, and a fourth 8-bit multiplicand XQ4 is multiplied by a fourth 8-bit multiplier YQ4 during a fourth multiplication to provide a fourth 16-bit product. The modified Booth's algorithm is used for all four multiplications. Therefore, each of the multiplications requires four partial products. Partial products PP1–PP16 each occupy 33 bit positions, and each successive partial product is left shifted by two bit positions with respect to the previous partial product. For instance, partial product PP1 occupies bit positions 0–32, partial product PP8 occupies bit positions 14–46, partial product PP9 occupies bit positions 16–48, and partial product PP16 occupies bit positions 30–62.

The first multiplication takes place in bit positions 0–15, the second multiplication takes place in bit positions 16–31, the third multiplication takes place in bit positions 32–47, and the fourth multiplication takes place in bit positions 48–63. Moreover, the first multiplication does not affect bit positions 16–63, the second multiplication does not affect bit positions 0–15 or 32–63, the third multiplication does not affect bit positions 0–31 or 48–63, and the fourth multiplication does not affect bit positions 0–47. Therefore, the first, second, third and fourth multiplications can proceed simultaneously without interfering with one another.

First multiplicand XQ1 as adjusted by first multiplier YQ1 using the modified Booth's algorithm is placed in the 9 right-most bit positions of partial products PP1–PP4, and second multiplicand XQ2 as adjusted by second multiplier YQ2 using the modified Booth's algorithm is placed in the 9 bit positions to the left of the 8 right-most bit positions of partial products PP5–PP8, third multiplicand XQ3 as adjusted by third multiplier YQ3 using the modified Booth's algorithm is placed in the 9 bit positions to the right of the 8 left-most bit positions of partial products PP9–PP12, and fourth multiplicand XQ4 as adjusted by fourth multiplier YQ4 using the modified Booth's algorithm is placed in the 9 left-most bit positions of partial products PP13–PP16. For instance, bit positions 0–8 of partial product PP1 receive multiplicand XQ1 adjusted by bit-pair $YQ1_1$ and $YQ1_0$ and a previous bit of zero using the modified Booth's algorithm, bit positions 16–24 of partial product PP5 receive multiplicand XQ2 adjusted by bit-pair $YQ2_1$ and $YQ2_0$ and a previous bit of zero using the modified Booth's algorithm, bit positions 32–40 of partial product PP9 receive multiplicand XQ3 adjusted by bit-pair $YQ3_1$ and $YQ3_0$ and a previous bit of zero using the modified Booth's algorithm, and bit positions 48–56 of partial product PP13 receive multiplicand XQ4 adjusted by multiplier bit-pair $YQ4_1$ and $YQ4_0$ and a previous bit of zero using the modified Booth's algorithm.

Since bit $YQ2_0$ (the LSB of second multiplier YH2) is adjacent to bit $YQ1_7$ (the MSB of first multiplier YQ1), bit $YQ3_0$ (the LSB of third multiplier YQ3) is adjacent to bit $YQ2_7$ (the MSB of second multiplier YQ2), and bit $YQ4_0$ (the LSB of fourth multiplier YQ4) is adjacent to bit $YQ3_7$ (the MSB of third multiplier YQ3), the modified Booth's algorithm treats bit $YQ1_7$ as a zero when recoding bit-pair $YQ2_1$ and $YQ2_0$, treats bit $YQ2_7$ as a zero when recoding bit-pair $YQ3_1$ and $YQ3_0$, and treats bit $YQ3_7$ as a zero when recoding bit-pair $YQ4_1$ and $YQ4_0$.

Furthermore, since bit $XQ2_0$ (the LSB of second multiplicand XQ2) is adjacent to bit $XQ1_7$ (the MSB of first multiplicand XQ1), bit $XQ3_0$ (the LSB of third multiplicand XQ3) is adjacent to bit $XQ2_7$ (the MSB of second multiplicand XQ2), and bit $XQ4_0$ (the LSB of fourth multiplicand XQ4) is adjacent to bit $XQ3_7$ (the MSB of third multiplicand XQ3), partial products PP5–PP8 treat bit $XQ1_7$ as a zero when left shifting second multiplicand XQ2 by one bit position and treat bit $XQ1_7$ as a one when left shifting the complement of second multiplicand XQ2 by one bit position, partial products PP9–PP12 treat bit $XQ2_7$ as a zero when left shifting third multiplicand XQ3 by one bit position and treat bit $XQ2_7$ as a one when left shifting the complement of third multiplicand XQ3 by one bit position, and partial products PP13–PP16 treat bit $XQ3_7$ as a zero when left shifting fourth multiplicand XQ4 by one bit position and treat bit $XQ3_7$ as a one when left shifting the complement of fourth multiplicand XQ4 by one bit position.

The increment bits (I) for partial products PP1–PP4 are added to their respective LSB positions (and are shown directly beneath their respective LSB positions), the increment bits for partial products PP5–PP8 are added to the LSB positions of their respective 25 left-most bit positions (and are shown directly beneath the LSB positions of their respective 25 left-most bit positions), the increment bits for partial products PP9–PP12 are added to the LSB positions of their respective 17 left-most bit positions (and are shown directly beneath the LSB positions of their respective 17 left-most bit positions), and the increment bits for partial products PP13–PP16 are added to the LSB positions of their respective 9 left-most bit positions (and are shown directly beneath the LSB positions of their respective 9 left-most bit position). For instance, the increment bit for partial product PP1 is at bit position 0, and the increment bit for partial product PP12 is at bit position 48. For ease of illustration, the increment bit for partial product PP5 is shown in partial product PP6, the increment bit for partial product PP6 is shown in partial product PP7, etc.

The sign generate method is used for sign extension. Therefore, for the first, second, third and fourth multiplications, the sign bit of each partial product is complemented ($\overline{S}$), a one is added to the immediate left of each sign bit position, and a one is added to the sign bit position of the first partial product. In the first multiplication, the adjusted multiplicands are placed in the 9 right-most bit positions of partial products PP1–PP4, the sign bits are at the MSB's of the 9 right-most bit positions, and therefore the complemented sign bits are in bit positions 8, 10, 12 and 14 of partial products PP1–PP4, respectively, and a one is added to bit positions 8, 9, 11, 13 and 15. In the second multiplication, the adjusted multiplicands are placed in the 9 bit positions to the left of the 8 right-most bit positions of partial products PP5–PP8, the sign bits are at the MSB's of the 9 bit positions, and therefore the complemented sign bits are in bit positions 24, 26, 28 and 30 of partial products PP5–PP8, respectively, and a one is added to bit positions 24, 25, 27, 29 and 31. In the third multiplication, the adjusted multiplicands are placed in the 9 bit positions to the right of the 8 left-most bit positions of partial products PP9–PP12, the sign bits are at the MSB's of the 9 bit positions, and therefore the complemented sign bits are in bit positions 40, 42, 44 and 46 of partial products PP9–PP12, respectively, and a one is added to bit positions 40, 41, 43, 45 and 47. In the fourth multiplication, the adjusted multiplicands are placed in the 9 left-most bit positions of partial products PP13–PP16, the sign bits are the MSB's of the partial products, and therefore the sign bits are in bit positions 56, 58, 60 and 62 of partial products PP13–PP16, respectively, and a one is added to bit positions 56, 57, 59, 61 and 63.

Preferably, the bit positions of partial products PP1–PP16 that do not receive the adjusted multiplicands are filled with zero's, and the one's from the sign generate method and the increment bits are added to the sum of the partial products. With this approach, the 24 left-most bit positions of partial products PP1–PP4 are filled with zero's, the 16 left-most and 8 right-most bit positions of partial products PP5–PP8 are filled with zero's, the 8 left-most and 16 right-most bit positions of partial products PP9–PP12 are filled with zero's, the 24 right-most bit positions of partial products PP13–PP16 are filled with zero's, the one's in bit positions 8, 9, 11, 13, 15, 24, 25, 27, 29, 31, 40, 41, 43, 45, 47, 56, 57, 59, 61 and 63 are added elsewhere, and the increment bits in bit positions 0, 2, 4, 6, 16, 18, 20, 22, 32, 34, 36, 38, 48, 50, 52 and 54 are added elsewhere.

Partial products PP1–PP16, the one's from the sign generate method and the increment bits are added to provide the first product at bit positions 0–15, the second product at bit positions 16–31, the third product at bit positions 32–47, and the fourth product at bit positions 48–63. Advantageously, the first, second, third and fourth multiplications can occur simultaneously without interfering with one another.

Figure 1:
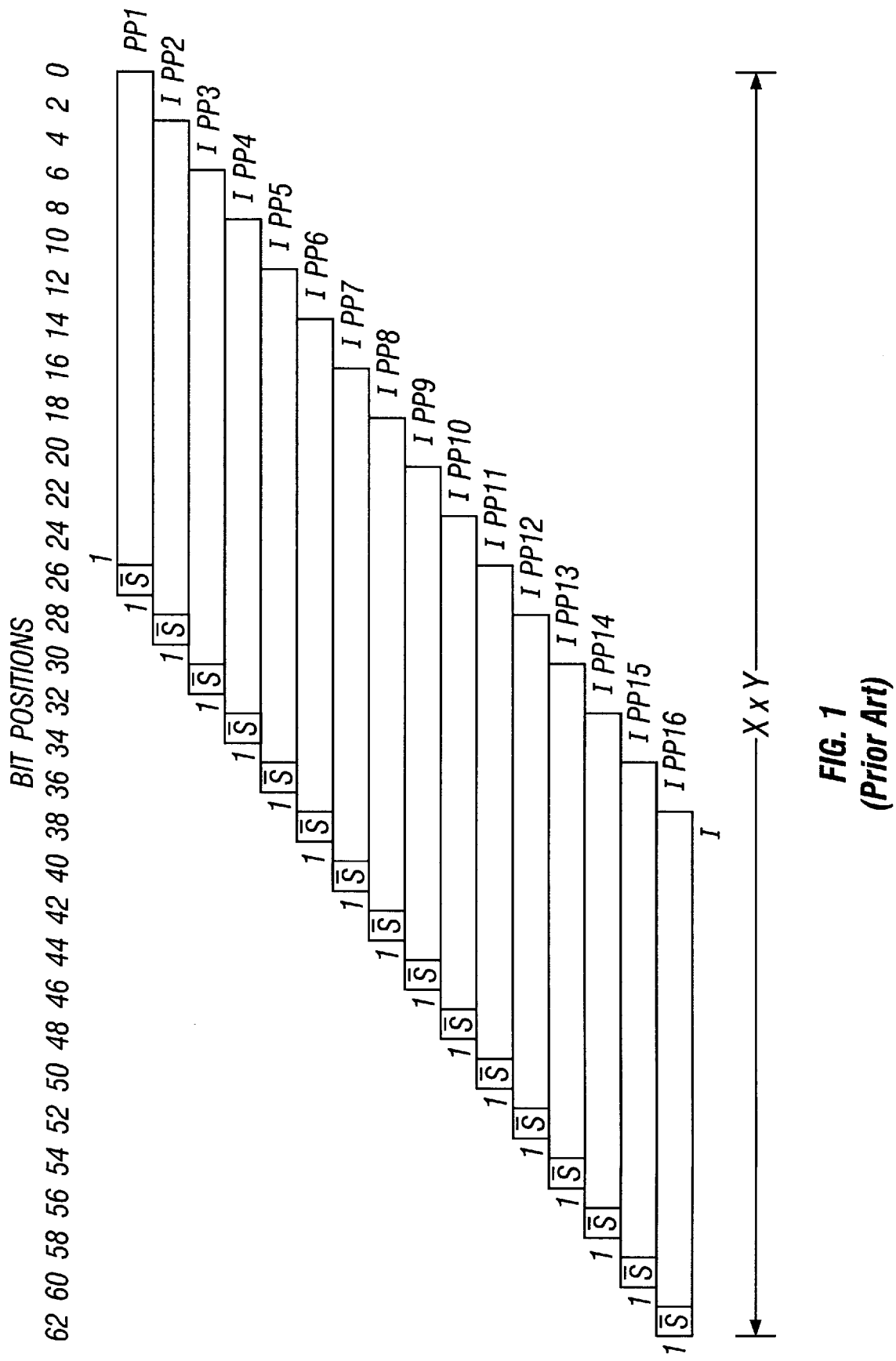
FIG. 1 is a schematic view showing parallel multiplication of a single multiplicand and a single multiplier using the modified Booth's algorithm and the sign generate method in accordance with the prior art.
Figure 4:
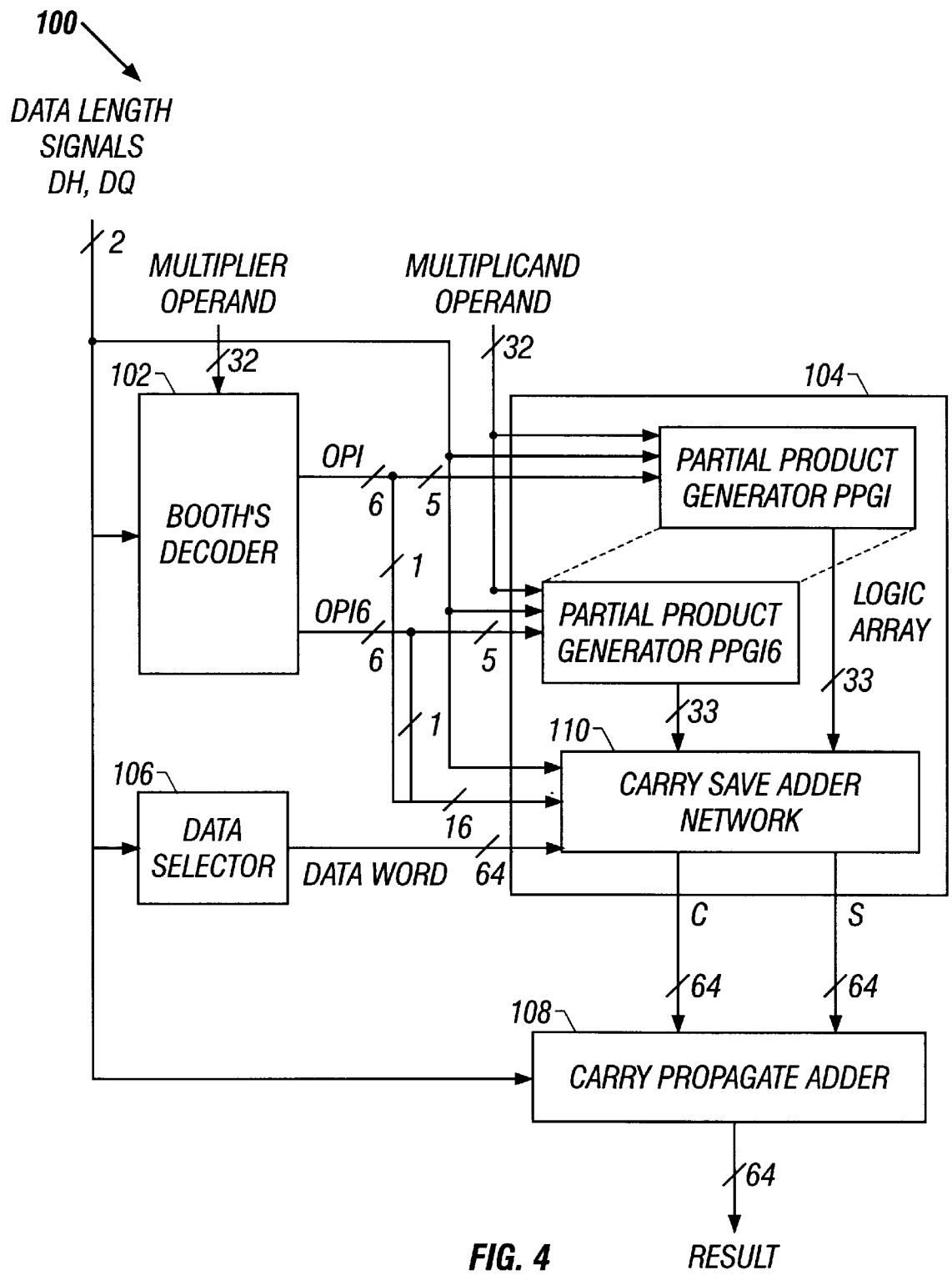
FIG. 4 is a block diagram of a parallel multiplier for implementing the techniques of FIGS. 1–3 in accordance with an embodiment of the invention.

FIG. 4 is a block diagram of parallel multiplier 100 for implementing the techniques of FIGS. 1–3. Parallel multiplier 100 includes Booth's decoder 102, logic array 104, data selector 106, and carry propagate adder 108. Parallel multiplier 100 is capable of multiplying a 32-bit multiplicand by a 32-bit multiplier, or simultaneously multiplying two 16-bit multiplicands by two 16-bit multipliers, or simultaneously multiplying four 8-bit multiplicands by four 8-bit multipliers.

Initially, a 32-bit multiplier operand is applied to Booth's decoder 102, a 32-bit multiplicand operand is applied to logic array 104, and data length signals DH and DQ are applied to Booth's decoder 102, logic array 104, data selector 106 and carry propagate adder 108. Data length signals DH and DQ indicate whether the data in the multiplicand operand and multiplier operand has a bit length of 32-bits (full length), 16-bits (half-length) or 8-bits (quarter-length), as listed below in Table 2.

TABLE 2

MULTIPLICAND(S) AND MULTIPLIER(S) AS A FUNCTION OF DATA LENGTH SIGNALS

| Data Length Signals | | | Multiplicand(s) in | | | | Multiplier(s) in | | | |
|---|---|---|---|---|---|---|---|---|---|---|
| DQ | DH | Data Length | Multiplicand operand | | | | Multiplier operand | | | |
| 0 | 0 | 32 bits | X | | | | Y | | | |
| 0 | 1 | 16 bits | XH2 | | XH1 | | YH2 | | YH1 | |
| 1 | 0 | 8 bits | XQ4 | XQ3 | XQ2 | XQ1 | YQ4 | YQ3 | YQ2 | YQ1 |

When data length signals DH and DQ are zero's, bit positions 0–31 of the multiplicand operand contain multiplicand X and bit positions 0–31 of the multiplier operand contain multiplier Y. When data length signal DH is a one and data length signal DQ is a zero, bit positions 0–15 of the multiplicand operand contain multiplicand XH1, bit positions 16–31 of the multiplicand operand contain multiplicand XH2, bit positions 0–15 of the multiplier operand contain multiplier YH1, and bit positions 16–31 of the multiplier operand contain multiplier YH2. Finally, when data length signal DQ is a one and data length signal DH is a zero, bit positions 0–7 of the multiplicand operand contain multiplicand XQ1, bit positions 8–15 of the multiplicand operand contain multiplicand XQ2, bit positions 16–23 of the multiplicand operand contain multiplicand XQ3, bit positions 24–31 of the multiplicand operand contain multiplicand XQ4, bit positions 0–7 of the multiplier operand contain multiplier YQ1, bit positions 8–15 of the multiplier operand contain multiplier YQ2, bit positions 16–23 of the multiplier operand contain multiplier YQ3, and bit positions 24–31 of the multiplier operand contain multiplier YQ4.

Booth's decoder 102 receives the multiplier operand and recodes the multiplier(s) according to the modified Booth's algorithm. Booth's decoder 102 also receives data length signals DH and DQ to ensure that when the least significant bit-pair of any multiplier is recoded, the previous bit is set to zero, as listed below in Table 3.

TABLE 3

BOOTH'S DECODER 102 - PREVIOUS MULTIPLIER BIT SET TO ZERO AS A FUNCTION OF DATA LENGTH SIGNALS

| Data Length Signals | | | Multiplier Operand Bit-Pair | | Previous Multiplier Operand Bit Set to Zero |
|---|---|---|---|---|---|
| DQ | DH | Multiplier | $Y_{i+1}$ | $Y_i$ | $Y_{i-1}$ |
| 0 | 0 | Y | $Y_1$ | $Y_0$ | appended |
| 0 | 1 | YH1 | $Y_1$ | $Y_0$ | appended |
|   |   | YH2 | $Y_{17}$ | $Y_{16}$ | $Y_{15}$ |
| 1 | 0 | YQ1 | $Y_1$ | $Y_0$ | appended |
|   |   | YQ2 | $Y_9$ | $Y_8$ | $Y_7$ |
|   |   | YQ3 | $Y_{17}$ | $Y_{16}$ | $Y_{15}$ |
|   |   | YQ4 | $Y_{25}$ | $Y_{24}$ | $Y_{23}$ |

When the multiplier operand contains more than one multiplier, the MSB of a multiplier adjacent to the least significant bit-pair of another multiplier is set to zero when that bit-pair is recoded. However, the MSB is not altered when the bit-pair containing that MSB is recoded. For instance, when data length signal DQ is a one and data length signal DH is a zero, multiplier operand bit $Y_{15}$ ($YQ2_7$) is considered a zero when multiplier operand bits $Y_{17}$ ($YQ3_1$) and $Y_{16}$ ($YQ3_0$) are being recoded, but is not altered when bit-pair $Y_{15}$ ($YQ2_7$) and $Y_{14}$ ($YQ2_6$) are being recoded. As a result, when several multipliers are present, each multiplier is recoded independently of the others.

Booth's decoder 102 sends operation words OP1–OP16 to logic array 104. Each operation word includes selection signals S0, SX, S2X, $\overline{SX}$, $\overline{S2X}$ and increment signal INC, and specifies one of five operations on the multiplicand operand, as listed below in Table 4.

TABLE 4

BOOTH'S DECODER 102 - OPERATIONS SPECIFIED BY SELECTION SIGNALS AND INCREMENT SIGNAL

| S0 | SX | S2X | $\overline{SX}$ | $\overline{S2X}$ | INC | Operation Multiplicand Operand (x) |
|---|---|---|---|---|---|---|
| 1 | 0 | 0 | 0 | 0 | 0 | 0 × X |
| 0 | 1 | 0 | 0 | 0 | 0 | +1 × X |
| 0 | 0 | 1 | 0 | 0 | 0 | +2 × X |
| 0 | 0 | 0 | 1 | 0 | 1 | −1 × X |
| 0 | 0 | 0 | 0 | 1 | 1 | −2 × X |

Logic array 104 includes partial product generators PPG1–PPG16 for generating partial product PP1–PP16, respectively, and carry save adder network 110. For ease of illustration, only partial product generators PPG1 and PPG16 are shown. Each partial product generator includes a row of 33 partial product cells for generating 33 partial product bits, and each partial product generator is left shifted by two bit positions with respect to the previous partial product generator. For instance, partial product generator PPG1 spans bit positions 0 to 32, partial product generator PPG2 spans bit positions 2 to 34, etc. Partial product generators PPG1–PPG16 receive the selection signals in operation words OP1–OP16, respectively, and also receive the multiplicand operand and data length signals DH and DQ.

Partial product generators PPG1–PPG16 operate on the multiplicand operand as a function of the selection signals. When selection signal S0 is a one the adjusted multiplicand is zero, when selection signal SX is a one the adjusted multiplicand is the multiplicand with the sign bit propagated left by one bit position, when selection signal S2X is a one the adjusted multiplicand is the multiplicand left shifted by one bit position with the LSB filled with a zero, when selection signal $\overline{SX}$ is a one the adjusted multiplicand is the complement of the multiplicand with the sign bit propagated left by one bit position, and when selection signal $\overline{S2X}$ is a one the adjusted multiplicand is the complement of the multiplicand left shifted by one bit position with LSB filled with a one. Furthermore, when the increment signal is a one the corresponding increment bit is set to a one.

Partial product generators PPG1–PPG16 also include bit-complementing logic for complementing selected partial product bits as a function of data length signals DH and DQ, and zero-forcing logic for setting selected partial product bits to zero as a function of data length signals DH and DQ, and LSB-setting logic for setting selected partial product bits to zero or one as a function of the selection signals and the data length signals. The complemented partial product bits, the partial product bits set to zero, the partial product bits set to zero or one, and the partial product bits that contain the adjusted multiplicands as a function of the data length signals (and the selection signals for the LSB-setting logic) are listed below in Tables 5, 6, 7 and 8.

TABLE 5

LOGIC ARRAY 104 — COMPLEMENTED PARTIAL PRODUCT BITS
AS A FUNCTION OF DATA LENGTH SIGNALS

| Data Length Signals | | Complemented Partial Product Bits (Partial Product Generator PPG# Above Bit Positions) | | | | | | | | | | | | | | | |
|---|---|---|---|---|---|---|---|---|---|---|---|---|---|---|---|---|---|
| DQ | DH | 1 | 2 | 3 | 4 | 5 | 6 | 7 | 8 | 9 | 10 | 11 | 12 | 13 | 14 | 15 | 16 |
| 0 | 0 | 32 | 34 | 36 | 38 | 40 | 42 | 44 | 46 | 48 | 50 | 52 | 54 | 56 | 58 | 60 | 62 |
| 0 | 1 | 16 | 18 | 20 | 22 | 24 | 26 | 28 | 30 | 48 | 50 | 52 | 54 | 56 | 58 | 60 | 62 |
| 1 | 0 | 8 | 10 | 12 | 14 | 24 | 26 | 28 | 30 | 40 | 42 | 44 | 46 | 56 | 58 | 60 | 62 |

TABLE 6

LOGIC ARRAY 104 — PARTIAL PRODUCT BITS SET TO ZERO
AS A FUNCTION OF DATA LENGTH SIGNALS

| Data Length Signals | | Partial Product Bits Set to Zero (Partial Product Generator PPG# Above Bit Positions) | | | | | | | | | | | | | | | |
|---|---|---|---|---|---|---|---|---|---|---|---|---|---|---|---|---|---|
| DQ | DH | 1 | 2 | 3 | 4 | 5 | 6 | 7 | 8 | 9 | 10 | 11 | 12 | 13 | 14 | 15 | 16 |
| 0 | 0 | | | | | | | NONE | | | | | | | | | |
| 0 | 1 | 17 to 32 | 19 to 34 | 21 to 36 | 23 to 38 | 25 to 40 | 27 to 42 | 29 to 44 | 31 to 46 | 16 to 31 | 18 to 33 | 20 to 35 | 22 to 37 | 24 to 39 | 26 to 41 | 28 to 43 | 30 to 45 |
| 1 | 0 | 9 to 32 | 11 to 34 | 13 to 36 | 15 to 38 | 8 to 15 25 to 40 | 10 to 17 27 to 42 | 12 to 19 29 to 44 | 14 to 21 31 to 46 | 16 to 31 41 to 48 | 18 to 33 43 to 50 | 20 to 35 45 to 52 | 22 to 37 47 to 54 | 24 to 47 | 26 to 49 | 28 to 51 | 30 to 53 |

TABLE 7

LOGIC ARRAY 104 — PARTIAL PRODUCT BITS SET TO ZERO/ONE AS A FUNCTION OF
SELECTION SIGNALS AND DATA LENGTH SIGNALS

| Data Length Signals | | Partial Product Bits Set to Zero/One When S2X/S2̄X̄ is a One (Partial Product Generator PPG# Above Bit Positions) | | | | | | | | | | | | | | |
|---|---|---|---|---|---|---|---|---|---|---|---|---|---|---|---|---|
| DQ | DH | 1 | 2 | 3 | 4 | 5 | 6 | 7 | 8 | 9 | 10 | 11 | 12 | 13 | 14 | 15 | 16 |
| 0 | 0 | 0 | 2 | 4 | 6 | 8 | 10 | 12 | 14 | 16 | 18 | 20 | 22 | 24 | 26 | 28 | 30 |
| 0 | 1 | 0 | 2 | 4 | 6 | 8 | 10 | 12 | 14 | 32 | 34 | 36 | 38 | 40 | 42 | 44 | 46 |
| 1 | 0 | 0 | 2 | 4 | 6 | 16 | 18 | 20 | 22 | 32 | 34 | 36 | 38 | 48 | 50 | 52 | 54 |

TABLE 8

LOGIC ARRAY 104 — PARTIAL PRODUCT BITS THAT CONTAIN ADJUSTED MULTIPLICANDS
AS A FUNCTION OF DATA LENGTH SIGNALS

| Data Length Signals | | | Partial Product Bits (Partial Product Generator PPG# Above Bit Positions) | | | | | | | | | | | | | | | |
|---|---|---|---|---|---|---|---|---|---|---|---|---|---|---|---|---|---|---|
| DQ | DH | Multiplicand | 1 | 2 | 3 | 4 | 5 | 6 | 7 | 8 | 9 | 10 | 11 | 12 | 13 | 14 | 15 | 16 |
| 0 | 0 | X | 0 to 32 | 2 to 34 | 4 to 36 | 6 to 38 | 8 to 40 | 10 to 42 | 12 to 44 | 14 to 46 | 16 to 48 | 18 to 50 | 20 to 52 | 22 to 54 | 24 to 56 | 26 to 58 | 28 to 60 | 30 to 62 |
| 0 | 1 | XH1 | 0 to 16 | 2 to 18 | 4 to 20 | 6 to 22 | 8 to 24 | 10 to 26 | 12 to 28 | 14 to 30 | | | | | | | | |
| | | XH2 | | | | | | | | | 32 to 48 | 34 to 50 | 36 to 52 | 38 to 54 | 40 to 56 | 42 to 58 | 44 to 60 | 46 to 62 |
| 1 | 0 | XQ1 | 0 to 8 | 2 to 10 | 4 to 12 | 6 to 14 | | | | | | | | | | | | |
| | | XQ2 | | | | | 16 to 24 | 18 to 26 | 20 to 28 | 22 to 30 | | | | | | | | |
| | | XQ3 | | | | | | | | | 32 to 40 | 34 to 42 | 36 to 44 | 38 to 46 | | | | |
| | | XQ4 | | | | | | | | | | | | | 48 to 56 | 50 to 58 | 52 to 60 | 54 to 62 |

As seen in Table 5, the complemented partial product bit in partial product generator PPG1, for instance, is in bit position 32 when data length signals DH and DQ are zero's, bit position 16 when data length signal DH is a one and data length signal DQ is a zero, and bit position 8 when data length signal DQ is a one and data length signal DH is a zero.

As seen in Table 6, the partial product bits set to zero (and therefore devoid of an adjusted multiplicand) in partial product generator PPG1, for instance, are nonexistent when data length signals DH and DQ are zero's, are in bit positions 17–32 when data length signal DH is a one and data length signal DQ is a zero, and are in bit positions 9–32 when data length signal DQ is a one and data length signal DH is a zero.

As seen in Table 7, the partial product bit in partial product generator PPG13, for instance, that is set to zero when selection signal S2X is a one and set to one when selection signal S2̄X̄ is a one, is in bit position 24 when data length signals DH and DQ are zero's, bit position 40 when data length signal DH is a one and data length signal DQ is a zero, and bit position 48 when data length signal DQ is a one and data length signal DH is a zero.

As seen in Table 8, the partial product bits that contain the adjusted multiplicand in partial product generator PPG1, for instance, are in bit position 0–32 when data length signals DH and DQ are zero's, bit position 0–16 when data length signal DH is a one and data length signal DQ is a zero, and bit position 0–8 when data length signal DQ is a one and data length signal DH is a zero.

It should be noted that the complemented partial product bits in Table 5 correspond to the complemented sign bits in the partial products in FIGS. 1, 2 and 3, the partial product bits set to zero in Table 6 correspond to the bit positions in the partial products bits set to zero (provided the sign generate one's and increment bits are added elsewhere) in FIGS. 1, 2 and 3, the partial product bits set to zero or one by the selection signals in Table 7 correspond to the LSB positions of the adjusted multiplicands in FIGS. 1, 2 and 3, and the partial product bits that receive the adjusted multiplicands in Table 8 correspond to similar bit positions in FIGS. 1, 2 and 3.

It should also be noted that the partial product bits set to zero in Table 6 are mutually exclusive with the partial product bits that receive the adjusted multiplicands in Table 8. When data length signals DH and DQ are zero's, in all of the partial product generators, the adjusted multiplicand X is at all the partial product bits, and none of the partial product bits are set to zero. When data length signal DH is a one and data length signal DQ is a zero, in partial product generator PPG1, for instance, the adjusted multiplicand XH1 is at bit positions 0–16, and bit positions 17–32 are set to zero's. When data length signal DH is a zero and data length signal DQ is a one, in partial product generator PPG6, for instance, the adjusted multiplicand XQ2 is at bit positions 18–26, and bit positions 10–17 and 27–42 are set to zero's.

Carry save adder network 110 adds the partial products, the increment bits (provided by the increment signals) and the sign generate bits (provided by the data word from data selector 106) to provide 64 final sum bits and 64 final carry-out bits. Furthermore, carry save adder network 110 includes carry-blocking logic for preventing a carry-out bit from one multiplication from interfering with another multiplication. When data length signals DH and DQ are zero's, the carry-blocking logic is inactive. When data length signal DH is a one and data length signal DQ is a zero, the carry-blocking logic prevents carry-out bits at bit position 31 from affecting position 32. When data length signal DQ is a one and data length signal DH is a zero, the carry-blocking logic prevents carry-out bits at bit position 15 from affecting bit position 16, prevents carry-out bits at bit position 31 from affecting bit position 32, and prevents carry-out bits at bit position 47 from affecting bit position 48.

Carry save adder network 110 adds the increment bits to selected bit positions, as listed below in Tables 9A and 9B.

TABLE 9A

CARRY SAVE ADDER NETWORK 110 — INCREMENT BITS (BIT POSITIONS 0–31)
AS A FUNCTION OF DATA LENGTH SIGNALS

| Data Length Signals | | Increment Bits (Bit Positions above Increment Bits) | | | | | | | | | | | | | | | |
|---|---|---|---|---|---|---|---|---|---|---|---|---|---|---|---|---|---|
| DQ | DH | 31 | 30 | 29 | 28 | 27 | 26 | 25 | 24 | 23 | 22 | 21 | 20 | 19 | 18 | 17 | 16 |
| 0 | 0 |    | I |    | I |    | I |    | I |    | I |    | I |    | I |    | I |
| 0 | 1 |    |   |    |   |    |   |    |   |    |   |    |   |    |   |    |   |
| 1 | 0 |    |   |    |   |    |   |    |   |    |   |    | I |    | I |    | I |    | I |

| Data Length Signals | | Increment Bits (Bit Positions above Increment Bits) | | | | | | | | | | | | | | | |
|---|---|---|---|---|---|---|---|---|---|---|---|---|---|---|---|---|---|
| DQ | DH | 15 | 14 | 13 | 12 | 11 | 10 | 9 | 8 | 7 | 6 | 5 | 4 | 3 | 2 | 1 | 0 |
| 0 | 0 |    | I |    | I |    | I |    | I |    | I |    | I |    | I |    | I |
| 0 | 1 | I |    | I |    | I |    | I |    | I |    | I |    | I |    | I |    |
| 1 | 0 |    |   |    |   |    |   |    |   |    | I |    | I |    | I |    | I |

TABLE 9B

CARRY SAVE NETWORK 110 — INCREMENT BITS (BIT POSITIONS 32–63)
AS A FUNCTION OF DATA LENGTH SIGNALS

| Data Length Signals | | Increment Bits (Bit Positions above Integer Bits) | | | | | | | | | | | | | | | |
|---|---|---|---|---|---|---|---|---|---|---|---|---|---|---|---|---|---|
| DQ | DH | 63 | 62 | 61 | 60 | 59 | 58 | 57 | 56 | 55 | 54 | 53 | 52 | 51 | 50 | 49 | 48 |
| 0 | 0 |    |   |    |   |    |   |    |   |    |   |    |   |    |   |    |   |
| 0 | 1 |    |   |    |   |    |   |    |   |    |   |    |   |    |   |    |   |
| 1 | 0 |    |   |    |   |    |   |    |   |    |   |    | I |    | I |    | I |    | I |

| Data Length Signals | | Increment Bits (Bit Positions above Integer Bits) | | | | | | | | | | | | | | | |
|---|---|---|---|---|---|---|---|---|---|---|---|---|---|---|---|---|---|
| DQ | DH | 47 | 46 | 45 | 44 | 43 | 42 | 41 | 40 | 39 | 38 | 37 | 36 | 35 | 34 | 33 | 32 |
| 0 | 0 |    |   |    |   |    |   |    |   |    |   |    |   |    |   |    |   |
| 0 | 1 | I |    | I |    | I |    | I |    | I |    | I |    | I |    | I |    |
| 1 | 0 |    |   |    |   |    |   |    |   |    |   |    | I |    | I |    | I |    | I |

As seen in Tables 9A and 9B, there are always 16 increment bits, and the bit positions of the increment bits is a function of data length signals DH and DQ. At bit position 30, for instance, an increment bit is present when data length signals DH and DQ are zero's, but an increment bit is nonexistent when data length signal DH or DQ is a one. Furthermore, there is one increment bit per partial product, and successive increment bits are associated with successive partial products. That is, the least significant increment bit is associated with partial product generator PPG1, the second-least significant increment bit is associated with partial product generator PPG2, etc. The increment bits are determined by the increment signals of operation words OP1–OP16. When an increment signal is a one the corresponding increment bit is a one, and when an increment signal is a zero the corresponding increment bit is a zero.

It is noted that in Tables 9A and 9B, the bit positions of the increment bits correspond to the bit positions of the increment bits in FIGS. 1, 2 and 3.

Data selector 106 receives data select signals DH and DQ, and generates a 64-bit data word that provides extra one's in accordance with the sign generate method, as listed below in Tables 10A and 10B.

save adders. For instance, row 1 of 3:2 carry save adders receives partial product bits from partial product generator PPG1, row 2 of 3:2 carry save adders receives partial product bits from partial product generator PPG2 and sum bits and carry-out bits from row 1 of 3:2 carry save adders, etc. In addition, each row of 3:2 carry save adders receives the increment bit associated with the corresponding partial product generator, with the bit position that receives the increment bit being a function of the data length signals DH and DQ (see Tables 9A and 9B). For instance, row 16 of 3:2

TABLE 10A

DATA SELECTOR 106 — DATA WORD (BIT POSITIONS 0–31)
AS A FUNCTION OF DATA LENGTH SIGNALS

| Data Length Signals | | Data Word (Bit Positions above Logical Values) | | | | | | | | | | | | | | | |
|---|---|---|---|---|---|---|---|---|---|---|---|---|---|---|---|---|---|
| DQ | DH | 31 | 30 | 29 | 28 | 27 | 26 | 25 | 24 | 23 | 22 | 21 | 20 | 19 | 18 | 17 | 16 |
| 0 | 0 | 0 | 0 | 0 | 0 | 0 | 0 | 0 | 0 | 0 | 0 | 0 | 0 | 0 | 0 | 0 | 0 |
| 0 | 1 | 1 | 0 | 1 | 0 | 1 | 0 | 1 | 0 | 1 | 0 | 1 | 0 | 1 | 0 | 1 | 1 |
| 1 | 0 | 1 | 0 | 1 | 0 | 1 | 0 | 1 | 1 | 0 | 0 | 0 | 0 | 0 | 0 | 0 | 0 |

| Data Length Signals | | Data Word (Bit Positions above Logical Values) | | | | | | | | | | | | | | | |
|---|---|---|---|---|---|---|---|---|---|---|---|---|---|---|---|---|---|
| DQ | DH | 15 | 14 | 13 | 12 | 11 | 10 | 9 | 8 | 7 | 6 | 5 | 4 | 3 | 2 | 1 | 0 |
| 0 | 0 | 0 | 0 | 0 | 0 | 0 | 0 | 0 | 0 | 0 | 0 | 0 | 0 | 0 | 0 | 0 | 0 |
| 0 | 1 | 0 | 0 | 0 | 0 | 0 | 0 | 0 | 0 | 0 | 0 | 0 | 0 | 0 | 0 | 0 | 0 |
| 1 | 0 | 1 | 0 | 1 | 0 | 1 | 0 | 1 | 1 | 0 | 0 | 0 | 0 | 0 | 0 | 0 | 0 |

TABLE 10B

DATA SELECTOR 106 — DATA WORD (BIT POSITIONS 32–63)
AS A FUNCTION OF DATA LENGTH SIGNALS

| Data Length Signals | | Data Word (Bit Positions above Logical Values) | | | | | | | | | | | | | | | |
|---|---|---|---|---|---|---|---|---|---|---|---|---|---|---|---|---|---|
| DQ | DH | 63 | 62 | 61 | 60 | 59 | 58 | 57 | 56 | 55 | 54 | 53 | 52 | 51 | 50 | 49 | 48 |
| 0 | 0 | 1 | 0 | 1 | 0 | 1 | 0 | 1 | 0 | 1 | 0 | 1 | 0 | 1 | 0 | 1 | 0 |
| 0 | 1 | 1 | 0 | 1 | 0 | 1 | 0 | 1 | 0 | 1 | 0 | 1 | 0 | 1 | 0 | 1 | 1 |
| 1 | 0 | 1 | 0 | 1 | 0 | 1 | 0 | 1 | 1 | 0 | 0 | 0 | 0 | 0 | 0 | 0 | 0 |

| Data Length Signals | | Data Word (Bit Positions above Logical Values) | | | | | | | | | | | | | | | |
|---|---|---|---|---|---|---|---|---|---|---|---|---|---|---|---|---|---|
| DQ | DH | 47 | 46 | 45 | 44 | 43 | 42 | 41 | 40 | 39 | 38 | 37 | 36 | 35 | 34 | 33 | 32 |
| 0 | 0 | 1 | 0 | 1 | 0 | 1 | 0 | 1 | 0 | 1 | 0 | 1 | 0 | 1 | 0 | 1 | 1 |
| 0 | 1 | 0 | 0 | 0 | 0 | 0 | 0 | 0 | 0 | 0 | 0 | 0 | 0 | 0 | 0 | 0 | 0 |
| 1 | 0 | 1 | 0 | 1 | 0 | 1 | 0 | 1 | 1 | 0 | 0 | 0 | 0 | 0 | 0 | 0 | 0 |

Preferably, carry save adder network 110 includes rows of carry save adders configured as a parallelogram or a Wallace tree for adding the partial products and most or all of the increment bits to provide intermediate sum bits and carry-out bits, and also includes a final row of carry save adders for adding the intermediate sum bits and carry-out bits with the data word and any remaining increment bits.

The parallelogram configuration can be implemented using 16 rows of 33 3:2 carry save adders (or full adders). Each row of 3:2 carry save adders receives partial product bits from a corresponding partial product generator as well as sum and carry-out bits from the previous row of 3:2 carry carry save adders receives the increment signal from operation word OP16 at one of bit positions 30, 46 and 54 as a function of data length signals DH and DQ. In this manner, the parallelogram configuration adds all the partial products and increment bits.

The Wallace tree configuration can be implemented using 7 rows of 4:2 33 carry save adders, with each 4:2 carry save adder provided by cascading two full adders. Row 1 of 4:2 carry save adders receives partial product bits from partial product generators PPG1–PPG4, row 2 of 4:2 carry save adders receives partial product bits from partial product generators PPG5–PPG8, row 3 of 4:2 carry save adders receives partial product bits from partial product generators PPG9–PPG12, row 4 of 4:2 carry save adders receives partial product bits from partial product generators PPG13–PPG16, row 5 of 4:2 carry save adders receives sum bits and carry-out bits from rows 1 and 2 of 4:2 carry save adders, row 6 of 4:2 carry save adders receives sum bits and carry-out bits from rows 3 and 4 of 4:2 carry save adders, and row 7 of 4:2 carry save adders receives the sum bits and carry-out bits from rows 5 and 6 of 4:2 carry save adders. In addition, row 1 of 4:2 carry save adders receives the increment bits associated with partial product generators PPG1–PPG4, row 2 of 4:2 carry save adders receives the increment bits associated with partial product generators PPG5–PPG8, row 3 of 4:2 carry save adders receives the increment bits associated with partial product generators PPG9–PPG12, and row 4 of the 4:2 carry save adders receives the increment bits associated with partial product generators PPG13–PPG15 and the increment bits associated with partial product generator PPG16 when data length signal DH or DQ is a one. In this manner, the Wallace tree configuration adds all the partial products and the increment bits except for the increment bit for partial product generator PPG16 at bit position 30 when data length signals DH and DQ are zero's, which instead is added by the final row of carry save adders.

As seen in Tables 10A and 10B, some bit positions of the data word are always a zero. Therefore, the final row of carry save adders in carry save adder network 110 includes half adders at bit positions where the data word is always a zero, and full adders at bit positions where the data word might be or is always a one, as listed below in Tables 11A and 11B.

In the final row of carry save adders, the half adders receive the sum bits and carry-out bits from previous carry save adders but are not coupled to the data word, whereas the full adders receive the sum bits and carry-out bits from previous carry save adders and also receive sign generate bits from the data word.

Alternatively, if desired, the final row of carry save adders can include 64 fall adders that receive the sum bits and carry-out bits from previous carry save adders as well as data bits from the data word at bit positions 0–63. With this approach, some or all of the increment signals can be connected to the final row of carry save adders since the increment bits and sign generate one's are at different bit positions. If a Wallace tree is used, a full adder can be provided at bit position 30 to receive the increment signal associated with partial product generator PPG16 when data length signals DH and DQ are zero's. Furthermore, the full adders at bit positions 57, 59, 61 and 63 can receive a one instead of the data word since the data word is always a one at these bit positions.

Carry propagate adder 108 receives final sum bits and carry-out bits from carry save adder network 110, and adds these bits to generate a 64-bit result. Carry propagate adder 108 also receives data length signals DH and DQ, and includes carry-blocking logic for preventing a carry-out bit from one product from interfering with another product. Data length signals DH and DQ determine whether the result generated by carry propagate adder 108 is a single 64-bit product, two 32-bit products, or four 16-bit products, as listed below in Table 12.

TABLE 11A

CARRY SAVE ADDER NETWORK 110 — FINAL ROW OF
CARRY SAVE ADDERS (BIT POSITIONS 0–31)
Final Row of Carry Save Adders (H = Half Adder, F = Full Adder)
(Bit Positions above Carry Save Adders)

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| F | H | F | H | F | H | F | F | F | H | F | H | F | H | F | F |
| 15 | 14 | 13 | 12 | 11 | 10 | 9 | 8 | 7 | 6 | 5 | 4 | 3 | 2 | 1 | 0 |
| F | H | F | H | F | H | F | F | H | H | H | H | H | H | H | H |

TABLE 11B

CARRY SAVE ADDER NETWORK 110 — FINAL ROW OF
CARRY SAVE ADDERS (BIT POSITIONS 32–63)
Final Row of Carry Save Adders (H = Half Adder, F = Full Adder)
(Bit Positions above Carry Save Adders)

| 63 | 62 | 61 | 60 | 59 | 58 | 57 | 56 | 55 | 54 | 53 | 52 | 51 | 50 | 49 | 48 |
|---|---|---|---|---|---|---|---|---|---|---|---|---|---|---|---|
| F | H | F | H | F | H | F | F | F | H | F | H | F | H | F | F |
| 47 | 46 | 45 | 44 | 43 | 42 | 41 | 40 | 39 | 38 | 37 | 36 | 35 | 34 | 33 | 32 |
| F | H | F | H | F | H | F | F | F | H | F | H | F | H | F | F |

TABLE 12

CARRY PROPAGATE ADDER 108 - RESULT AS A FUNCTION OF DATA LENGTH SIGNALS

| Data Length Signals | | Product | | | | |
|---|---|---|---|---|---|---|
| DQ | DH | Length(s) | | Result | | |
| 0 | 0 | 64 bits | | X × Y | | |
| 0 | 1 | 32 bits | XH2 × YH2 | | XH1 × xYH1 | |
| 1 | 0 | 16 bits | XQ4 × YQ4 | XQ3 × YQ3 | XQ2 × YQ2 | XQ1 × YQ1 |

When data length signals DH and DQ are zero's, bit positions 0–63 of the result contain the product of multiplicand X and multiplier Y. When data length signal DH is a one and data length signal DQ is a zero, bit positions 0–31 of the result contain the product of multiplicand XH1 and multiplier YH1, and bit positions 32–63 of the result contain the product of multiplicand XH2 and multiplier YH2. Finally, when data length signal DQ is a one and data length signal DH is a zero, bit positions 0–15 of the result contain the product of multiplicand XQ1 and multiplier YH1, bit positions 16–31 of the result contain the product of multiplicand XQ2 and multiplier YQ2, bit positions 32–47 of the result contain the product of multiplicand XQ3 and multiplier YQ3, and bit positions 48–63 of the result contain the product of multiplicand XQ4 and multiplier YQ4.

Furthermore, when data length signals DH and DQ are zero's, the carry-blocking logic is inactive. When data length signal DH is a one and data length signal DQ is a zero, the carry-blocking logic sets the carry-out bit from bit position 31 to zero. When data length signal DQ is a one and data length signal DH is a zero, the carry-blocking logic sets the carry-out bits from bit positions 15, 31 and 47 to zero's. In this manner, the carry-out bit from the MSB position of a product does not corrupt the LSB position of an adjacent product.

Carry propagate adder 108 can be implemented as a carry lookahead adder with a propagate-generate (PG) section, a carry chain and a sum generator, in which the carry-blocking logic is coupled to carry-out bits in bit positions 15, 31 and 47 of the carry chain.

Figure 5A:
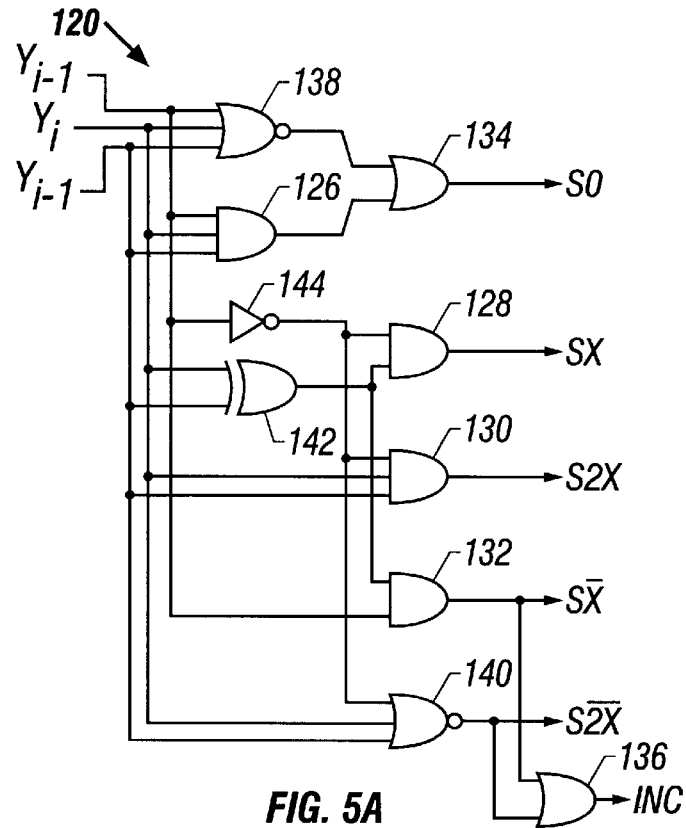
FIGS. 5A–5C are circuit diagrams of decoder cells in a Booth's decoder used in the parallel multiplier of FIG. 4.
Figure 5B:
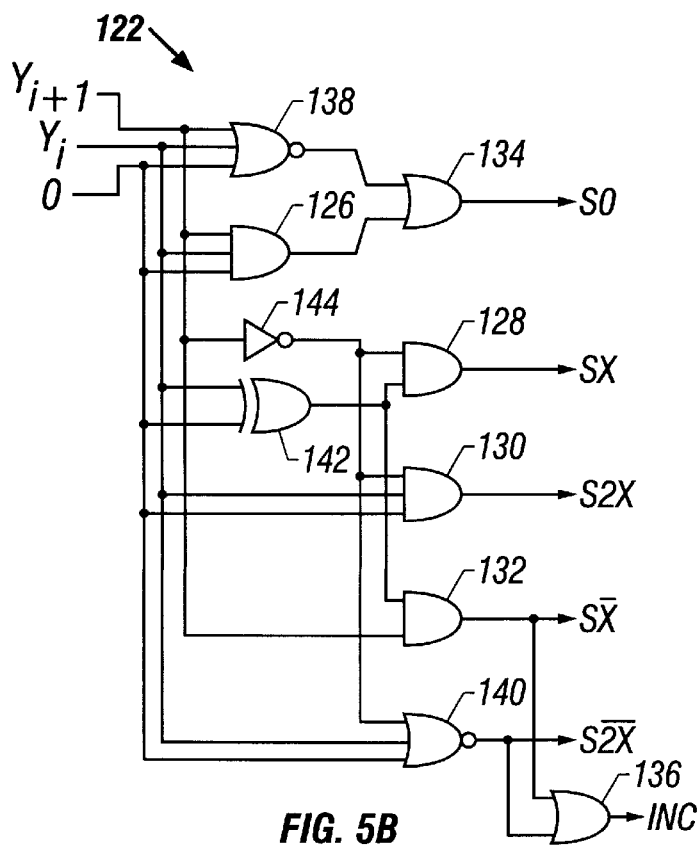
Figure 5C:
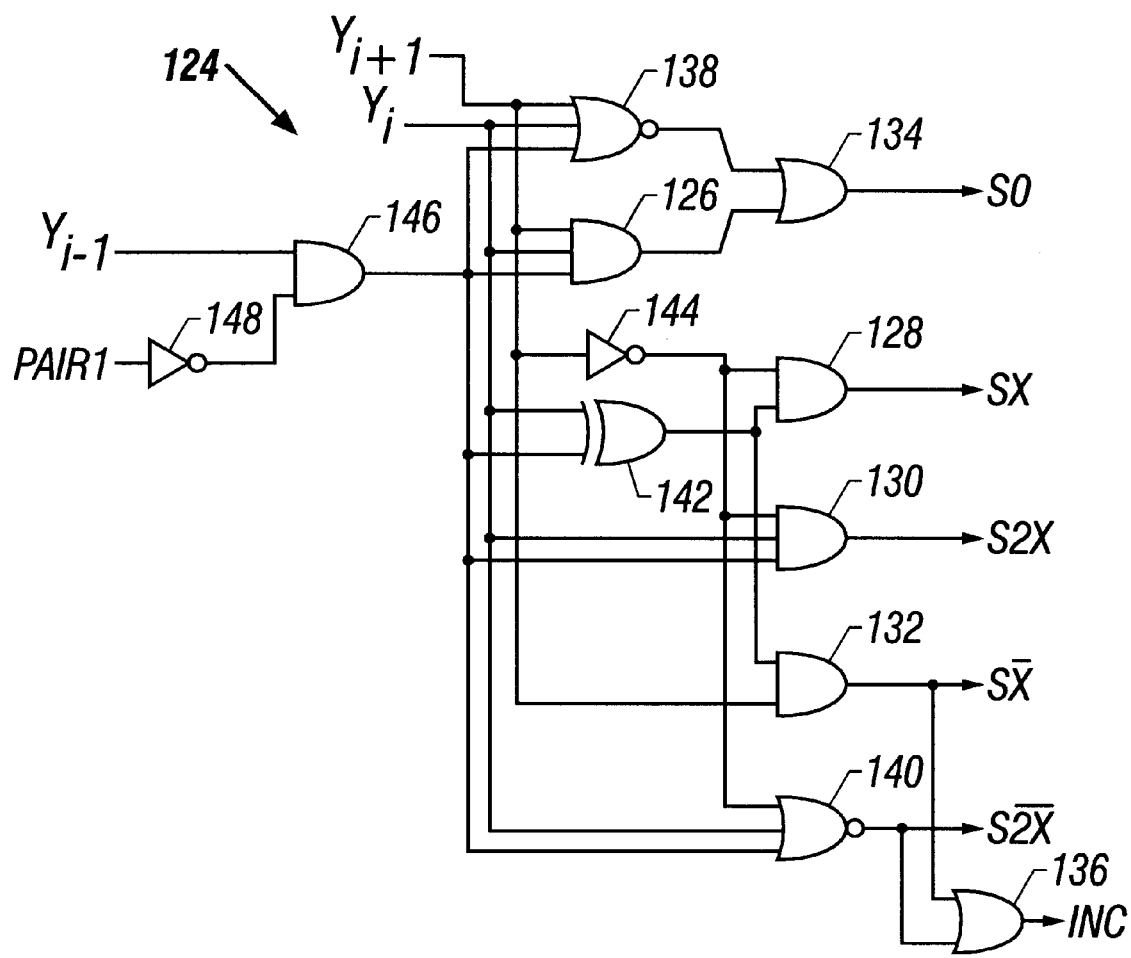

FIGS. 5A–5C are circuit diagrams of decoder cells 120, 122 and 124, respectively, in Booth's decoder 102. In FIG. 5A, decoder cell 120 includes AND gates 126, 128, 130, 132, OR gates 134 and 136, NOR gates 138 and 140, XOR gate 142 and inverter 144 for generating the selection signals and increment signal based on multiplier bit-pair $Y_{i+1}$ and $Y_i$ and previous multiplier bit $Y_{i-1}$. In FIG. 5B, decoder cell 122 is similar to decoder cell 120, except that decoder cell 122 generates the selection signals and increment signal based on multiplier bit-pair $Y_{i+1}$ and $Y_i$ and a previous multiplier bit of zero. If desired, decoder cell 122 can be implemented without AND gates 126 and 130, OR gate 134 and XOR gate 142. In FIG. 5C, decoder cell 124 is similar to decoder cell 120, except that decoder cell 124 includes AND gate 146 and inverter 148 that force the previous multiplier bit $Y_{i-1}$ to zero when signal PAIR1 is a one. Accordingly, a total of twelve decoder cells 120, one decoder cell 122, and three decoder cells 124 provide the operation words (composed of the selection signals and increment signals) for Booth's decoder 102, as listed below in Table 13.

TABLE 13

BOOTH'S DECODER 102 - DECODER CELLS

| Multiplier Operand Bit Positions | Operation Word | Decoder Cell | PAIR1 Signal |
|---|---|---|---|
| 1-0 | OP1 | 122 | n/a |
| 3-2 | OP2 | 120 | n/a |
| 5-4 | OP3 | 120 | n/a |
| 7-6 | OP4 | 120 | n/a |
| 9-8 | OP5 | 124 | DQ |
| 11-10 | OP6 | 120 | n/a |
| 13-12 | OP7 | 120 | n/a |
| 15-14 | OP8 | 120 | n/a |
| 17-16 | OP9 | 124 | DQ + DH |
| 19-18 | OP10 | 120 | n/a |
| 21-20 | OP11 | 120 | n/a |
| 23-22 | OP12 | 120 | n/a |
| 25-24 | OP13 | 124 | DQ |
| 27-26 | OP14 | 120 | n/a |
| 29-28 | OP15 | 120 | n/a |
| 31-30 | OP16 | 120 | n/a |

The decoder cells 124 that generate operation words OP5 and OP13 receive data length signal DQ as signal PAIR1, and the decoder cell 124 that generates operation word OP9 receives the OR of data length signals DH and DQ as signal PAIR1.

Figure 6A:
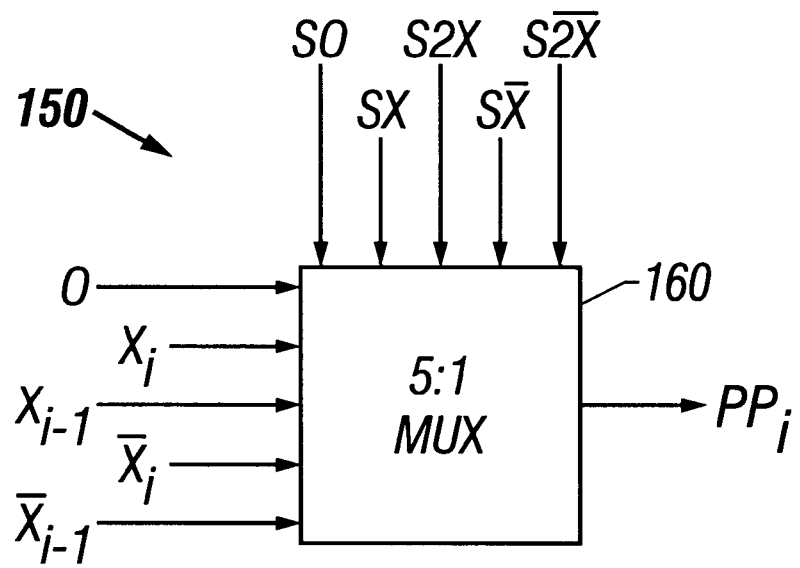
FIGS. 6A–6F are circuit diagrams of partial product cells in partial product generators used in the parallel multiplier of FIG. 4.

FIGS. 6A–6F are circuit diagrams of partial product cells 150, 152, 154, 156, 158 and 159, respectively, in partial product generators PPG1–PPG16. In FIG. 6A, partial product cell 150 includes 5:1 multiplexer 160 that receives selection signals S0, SX, S2X, $S\overline{X}$, $S\overline{2X}$ at select input, receives a zero and multiplicand bits $X_i$, $X_{i-1}$, $\overline{X_i}$ and $\overline{X_{i-1}}$ at operand inputs, and generates partial product bit $PP_i$ in response to the selection signals, as listed below in Table 14.

TABLE 14

MULTIPLEXER 160 - PARTIAL PRODUCT BIT AS A FUNCTION OF SELECTION SIGNALS

| S0 | SX | S2X | $S\overline{X}$ | $S\overline{2X}$ | $PP_i$ |
|---|---|---|---|---|---|
| 1 | 0 | 0 | 0 | 0 | 0 |
| 0 | 1 | 0 | 0 | 0 | $X_i$ |
| 0 | 0 | 1 | 0 | 0 | $X_{i-1}$ |
| 0 | 0 | 0 | 1 | 0 | $\overline{X_i}$ |
| 0 | 0 | 0 | 0 | 1 | $\overline{X_{i-1}}$ |

Figure 6B:
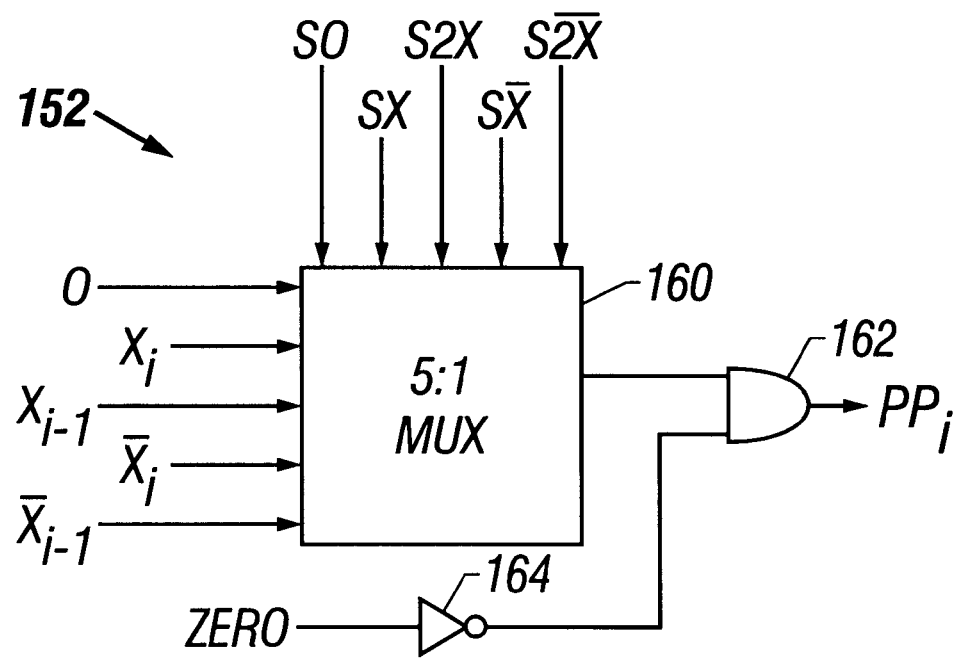
Figure 6C:
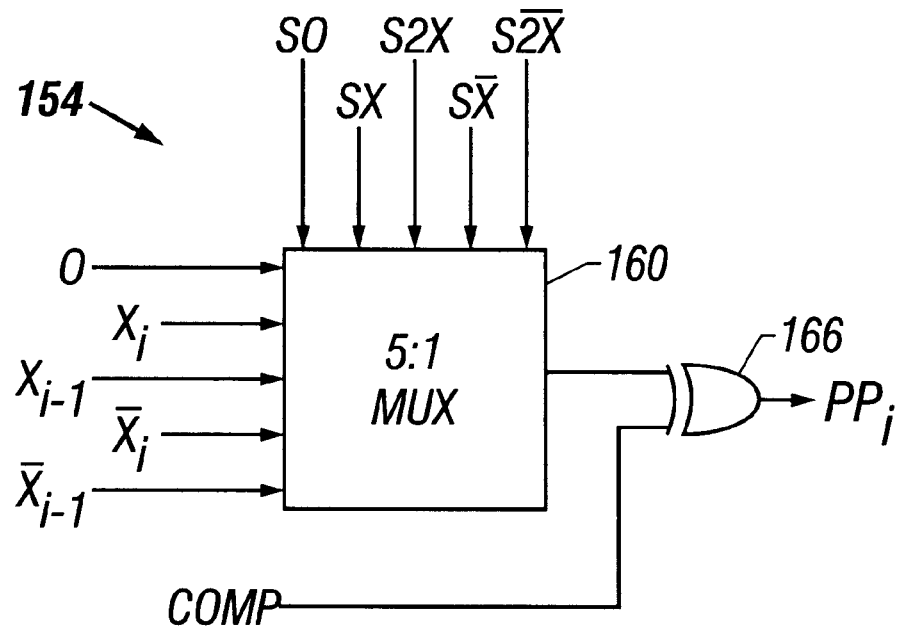
Figure 6D:
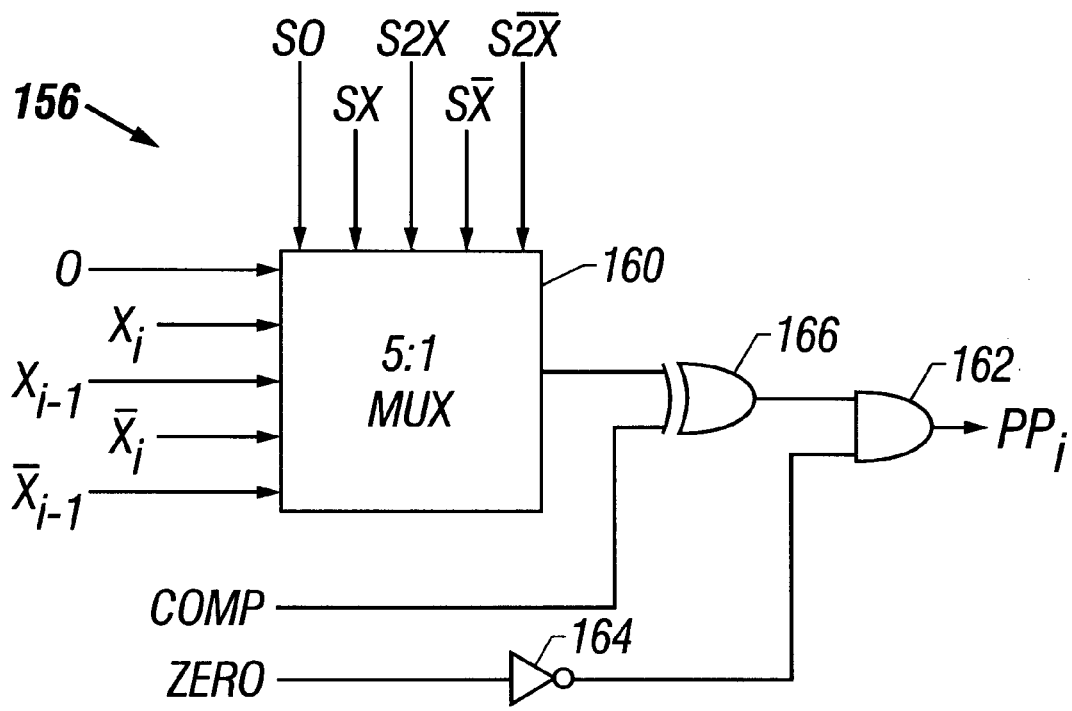
Figure 6E:
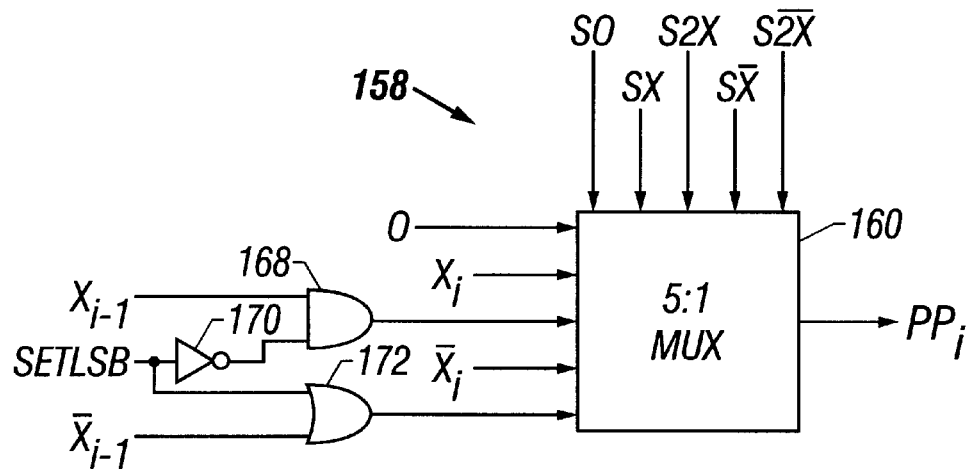
Figure 6F:
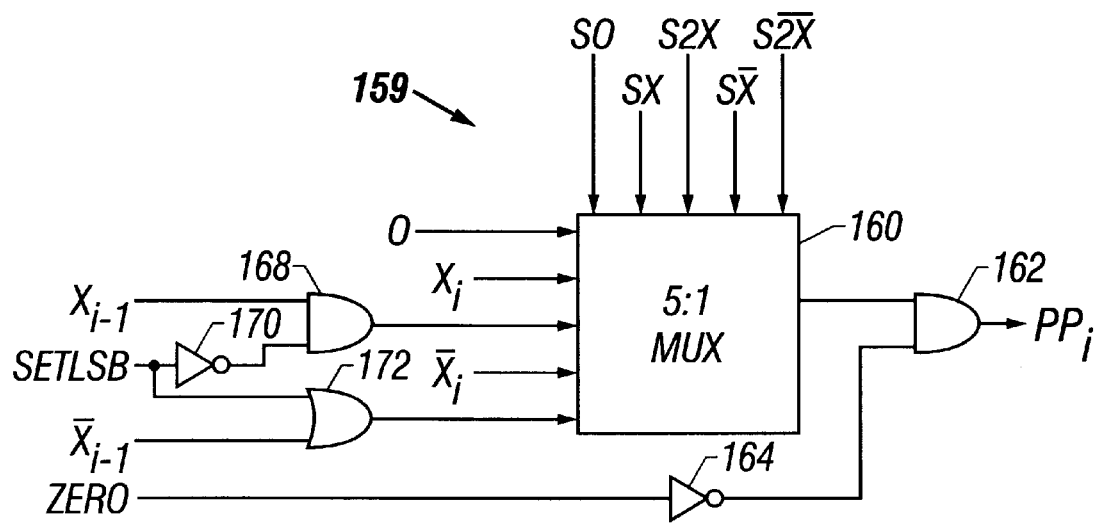

In FIG. 6B, partial product cell 152 is similar to partial product cell 150, except that partial product cell 150 includes AND gate 162 and inverter 164 that force the partial product bit to zero when signal ZERO is a one. In FIG. 6C, partial product cell 154 is similar to partial product cell 150, except that partial product cell 154 includes XOR gate 166 that complements the partial product bit when signal COMP is a one. In FIG. 6D, partial product cell 156 is similar to partial product cell 150, except that partial product cell 156 includes AND gate 162, inverter 164 and XOR gate 166 that function as previously described. In FIG. 6E, partial product cell 158 is similar to partial product cell 150, except that partial product cell 158 includes AND gate 168, inverter 170 and OR gate 172 that set multiplicand bit $X_{i-1}$ to a zero and set multiplicand bit $\overline{X_{i-1}}$ to a one when signal SETLSB is a one. Accordingly, when signal SETLSB is a one, the partial product is zero/one when selection signal S2X/$\overline{S2X}$ is a one. In FIG. 6F, partial product cell 159 is similar to partial product cell 150, except that partial product cell 159 includes AND gates 162 and 168, inverters 164 and 170, and OR gate 172 that function as previously described. The functional capabilities of partial product cells 150, 152, 154, 156, 158 and 159 are summarized below in Table 15.

TABLE 15

PARTIAL PRODUCT CELLS 150, 152, 154, 156, 158 AND 159 - FUNCTIONAL CAPABILITIES

| Partial Product Cell | Partial Product Bit as a Function of Selection Signals | Partial Product Bit Set to Zero as a Function of Signal ZERO | Partial Product Bit Complemented as a Function of Signal COMP | Partial Product Bit Set to Zero/One as a Function of Signals S2X/$\overline{S2X}$ and SETLSB |
|---|---|---|---|---|
| 150 | yes | no | no | no |
| 152 | yes | yes | no | no |
| 154 | yes | no | yes | no |
| 156 | yes | yes | yes | no |
| 158 | yes | no | no | yes |
| 159 | yes | yes | no | yes |

Accordingly, each partial product generator PPG1–PPG16 includes thirty-three partial product cells, with one of partial product cells 150, 152, 154, 156, 158 and 159 at each bit position. The choice of which partial product cell to place at a given bit position depends on the functional requirements at that bit position. Partial product cell 150 is at those bit positions that need not be complemented or set to zero or contain the LSB of an adjusted multiplicand as a function of data length signals DH and DQ. Partial product cell 152 is at those bit positions which may be set to zero but need not complemented or contain the LSB of an adjusted multiplicand as a function of data length signals DH and DQ. Partial product cell 154 is at those bit positions which may be complemented but need not be set to zero or contain the LSB of an adjusted multiplicand as a function of data length signals DH and DQ. Partial product cell 156 is at those bit positions which may be complemented or set to zero but need not contain the LSB of an adjusted multiplicand as a function of data length signals DH and DQ. Partial product cell 158 is at those bit positions that need not be complemented or set to zero but may contain the LSB of an adjusted multiplicand as a function of data length signals DH and DQ. Partial product cell 159 is at those bit positions that need not be complemented but may be set to zero or contain the LSB of an adjusted multiplicand as a function of data length signals DH and DQ.

For instance, in partial product generator PPG1, bit positions 8, 16 and 32 may be complemented (see Table 5), bit positions 9–32 may be set to zero (see Table 6), and bit position 0 is set to zero/one when selection signal S2X/$\overline{S2X}$ is a one (see Table 7). Therefore in partial product generator PPG1, partial product cell 150 is placed in bit positions 1–7, partial product cell 152 is placed in bit positions 9–15 and 17–31, partial product cell 154 is placed in bit position 8, partial product cell 156 is placed in bit positions 16 and 32, and partial product cell 158 is placed at bit position 0. Signal ZERO for partial product cell 152 at bit positions 9–15 and partial product cell 156 at bit position 16 is provided by data length signal DQ, and signal ZERO for partial product cell 152 at bit positions 17–31 and partial product cell 156 at bit position 32 is provided by the OR of data length signals DH and DQ. Signal COMP for partial product cell 154 at bit position 8 is provided by data length signal DQ, signal COMP for partial product cell 156 at bit position 16 is provided by data length signal DH, and signal COMP for partial product cell 156 at bit position 32 is provided by the NOR of data length signals DH and DQ. Signal SETLSB for partial product cell 158 at bit position 0 is a one, regardless of data length signals DH and DQ.

As another example, in partial product generator PPG9, bit positions 40 and 48 may be complemented (see Table 5), bit positions 16–31 and 41–48 may be set to zero (see Table 6), and bit positions 16 and 32 may be set to zero/one when selection signal S2X/$\overline{S2X}$ is a one (see Table 7). Therefore in partial product generator PPG9, partial product cell 150 is placed at bit positions 33–39, partial product cell 152 is placed at bit positions 17–31 and 41–47, partial product cell 154 is placed at bit position 40, partial product cell 156 is placed at bit position 48, partial product cell 158 is placed at bit position 32, and partial product cell 159 is placed at bit position 16. Signal ZERO for partial product cell 152 at bit positions 17–31 and partial product cell 159 at bit position 16 is provided by the OR of data length signals DH and DQ, and signal ZERO for partial product cell 152 at bit positions 41–47 and partial product cell 156 at bit position 48 is provided by data length signal DQ. Signal COMP for partial product cell 154 at bit position 40 is provided by data length signal DQ, and signal COMP for partial product cell 156 at bit position 48 is provided by the complement of data length signal DQ. Signal SETLSB for partial product cell 156 at bit position 48 is provided by the complement of data length signal DQ, and signal SETLSB for partial product cell 159 at bit position 40 is provided by data length signal DQ.

The description of the invention set forth herein is illustrative, and is not intended to limit the scope of the invention as set forth in the following claims. For instance, the parallel multiplier can be constructed to accommodate various bit lengths as well as to perform three or more simultaneous multiplications. The multiplicand(s) and multiplier(s) can have different bit lengths. A general purpose computer or processor can include the parallel multiplier. Variations and modifications of the embodiments disclosed herein may be made based on the description set forth herein, without departing from the scope and spirit of the invention as set forth in the following claims.

What is claimed is:

1. A parallel multiplier, comprising:
   logic for receiving an N-bit multiplicand operand, an M-bit multiplier operand, and a data length signal;
   the logic for calculating an N+M bit product of an N-bit multiplicand from the multiplicand operand and an M-bit multiplier from the multiplier operand when the data length signal selects a first bit length; and
   the logic for simultaneously calculating an (N+M)/2 bit first product of an N/2 bit first multiplicand from the multiplicand operand and an M/2 bit first multiplier from the multiplier operand, and an (N+M)/2 bit second product based on an N/2 bit second multiplicand from the multiplicand operand and an M/2 bit second multiplier from the multiplier operand when the data length signal selects a second bit length.

2. The parallel multiplier of claim 1, wherein the logic includes partial product generators that generate partial products composed of partial product bits, and calculating the products includes summing the partial products.

3. The parallel multiplier of claim 2, wherein the logic includes carry save adders configured as a parallelogram pattern for summing the partial products.

4. The parallel multiplier of claim 2, wherein the logic includes carry save adders configured as a Wallace tree for summing the partial products.

5. The parallel multiplier of claim 2, wherein the logic includes sign extension logic for complementing selected partial product bits and setting to zero selected partial product bits and generating a first data word to be added to the partial products when the data length signal selects the first bit length, and for complementing selected partial product bits and setting to zero selected partial product bits and generating a second data word to be added to the partial products when the data length signal selects the second bit length.

6. The parallel multiplier of claim 1, wherein the logic includes a Booth's decoder for recoding bit-pairs of the multiplier in accordance with the modified Booth's algorithm when the data length signal selects the first bit length, and for recoding bit-pairs of the first and second multipliers in accordance with the modified Booth's algorithm when the data length signal selects the second bit length.

7. The parallel multiplier of claim 1, wherein the logic includes a carry lookahead adder for providing an N+M bit result, N+M bits of the result provide the product when the data length signal selects the first bit length, (N+M)/2 right-most bits of the result provide the first product when the data length signal selects the second bit length, and N+M)/2 left-most bits of the result provide the second product when the data length signal selects the second bit length.

8. The parallel multiplier of claim 1, wherein:
the logic is for receiving a second data length signal; and
the logic is for simultaneously calculating a first (N+M)/4 bit product based on an N/4 bit first multiplicand from the multiplicand operand and an M/4 bit first multiplier from the multiplier operand, a second (N+M)/4 bit product based on an N/4 bit second multiplicand from the multiplicand operand and an M/4 bit second multiplier from the multiplier operand, a third (N+M)/4 bit product based on an N/4 bit third multiplicand from the multiplicand operand and an M/4 bit third multiplier from the multiplier operand, and a fourth (N+M)/4 bit product based on an N/4 bit fourth multiplicand from the multiplicand operand and an M/4 bit fourth multiplier from the multiplier operand when the second data length signal selects a second bit length.

9. The parallel multiplier of claim 1, wherein the first multiplicand is based on N/2 right-most bits of the multiplicand operand, the second multiplicand is based on N/2 left-most bits of the multiplicand operand, the first multiplier is based on M/2 right-most bits of the multiplier operand, and the second multiplier is based on M/2 left-most bits of the multiplier operand.

10. A processor including the parallel multiplier of claim 1.

11. A parallel multiplier for multiplying data with multiple bit lengths, comprising:
a Booth's decoder for receiving an M-bit multiplier operand, for recoding bit-pairs of the multiplier operand in accordance with the modified Booth's algorithm and for providing selection signals and increment bits as a function of a data length signal;
partial product generators for receiving an N-bit multiplicand operand and the selection signals and for generating M/2 partial products each containing N+1 partial product bits;
sign generate logic for complementing selected partial product bits, setting to zero selected partial product bits, and providing sign generate bits as a function of the data length signal;
a carry save adder network for summing the partial products and the increment bits and the sign generate bits to provide final sum bits and carry-out bits;
a carry propagate adder for adding the final sum bits and carry-out bits to provide an N+M bit result; and
carry-blocking logic for setting to zero selected carry-out bits in the carry save adder network and the carry propagate adder as a function of the data length signal;
wherein the result provides an N+M bit product of an N-bit multiplicand and an M-bit multiplier when the data length signal selects a first bit length, and the result provides a first (N+M)/2 bit product of a first N/2 bit multiplicand and a first M/2 bit multiplier and a second (N+M)/2 bit product of a second N/2 bit multiplicand and a second M/2 bit multiplier when the data length signal selects a second data length.

12. The parallel multiplier of claim 11, wherein the N-bit multiplicand is provided by N bits of the multiplicand operand, the first multiplicand is provided by N/2 right-most bits of the multiplicand operand, the second multiplicand is provided by N/2 left-most bits of the multiplicand operand, the M-bit multiplier is provided by M-bits of the multiplier operand, the first multiplier is provided by M/2 right-most bits of the multiplier operand, and the second multiplier is provided by M/2 left-most bits of the multiplier operand.

13. The parallel multiplier of claim 11, wherein the carry save adder network includes carry save adders that are configured as a parallelogram.

14. The parallel multiplier of claim 11, wherein the carry save adder network includes carry save adders that are configured as a Wallace tree.

15. A parallel multiplier for multiplying data with multiple bit lengths, comprising:
a Booth's decoder for receiving an M-bit multiplier operand and a data length signal, for providing M/2 sets of operation words based recoding bit-pairs of an M-bit multiplier from the multiplier operand in accordance with the modified Booth's algorithm when the data length signal selects a first bit length, and for providing M/4 first sets of the operation words based on recoding bit-pairs of an M/2 bit first multiplier from M/2 right-most bits of the multiplier operand in accordance with the modified Booth's algorithm and providing M/4 second sets of the selection signals based on recoding bit-pairs of an M/2 bit second multiplier from M/2 left-most bits of the multiplier operand in accordance with the modified Booth's algorithm when the data length signal selects a second bit length, wherein the operation signals include selection signals and increment signals, wherein the operation words include selection signals and increment signals, and the increment signals provide increment bits;

partial product generators for receiving an N-bit multiplicand operand and the selection signals, and for generating M/2 partial products each containing N+1 partial product bits;

sign extension logic for complementing selected partial product bits and setting to zero selected partial product bits and generating a data word to be added to the partial product bits as a function of the data length signal;

carry-blocking logic for setting selected carry-out bits to zero as a function of the data length signal; and an adder for summing the partial products and the increment bits and the data word to provide an N+M bit result, wherein the result provides an N+M bit product when the data length signal selects a first data length, and the result simultaneously provides two (N+M)/2 bit products when the data length signal selects a second data length.

16. The parallel multiplier of claim 15, wherein the adder includes carry save adders configured as a parallelogram pattern.

17. The parallel multiplier of claim 15, wherein the adder includes carry save adders configured as a Wallace tree.

18. The parallel multiplier of claim 15, wherein the adder includes carry save adders coupled to a carry propagate adder that provides the result.

19. The parallel multiplier of claim 15, wherein the selected carry-out bits are set to zero when the data length signal selects the second data length.

20. The parallel multiplier of claim 15, wherein N and M are each equal to 32.

* * * * *